United States Patent
Asano et al.

(10) Patent No.: US 10,508,680 B2
(45) Date of Patent: Dec. 17, 2019

(54) CONNECTING STRUCTURE OF END PIECE AND OUTER CABLE IN BOWDEN CABLE AND METHOD FOR CONNECTING THE SAME

(71) Applicant: YAMATO INDUSTRIAL CO., LTD., Hamamatsu-shi, Shizuoka (JP)

(72) Inventors: Keita Asano, Hamamatsu (JP); Kengo Maeda, Hamamatsu (JP)

(73) Assignee: Yamato Industrial Co., Ltd., Shizouka (JP)

( * ) Notice: Subject to any disclaimer, the term of this patent is extended or adjusted under 35 U.S.C. 154(b) by 308 days.

(21) Appl. No.: 15/466,310

(22) Filed: Mar. 22, 2017

(65) Prior Publication Data

US 2018/0274582 A1    Sep. 27, 2018

(51) Int. Cl.
*F16C 1/26* (2006.01)
*B29C 45/14* (2006.01)
*B29L 31/00* (2006.01)
*B29K 705/00* (2006.01)

(52) U.S. Cl.
CPC ........ *F16C 1/262* (2013.01); *B29C 45/14549* (2013.01); *B29C 2045/14327* (2013.01); *B29K 2705/00* (2013.01); *B29L 2031/707* (2013.01)

(58) Field of Classification Search
CPC ...... F16C 1/262; F16C 1/103; F16C 2220/04; F16C 2326/08; B29C 45/14549; B29C 2045/14327; B29K 2705/00; B29L 2031/707

See application file for complete search history.

(56) References Cited

U.S. PATENT DOCUMENTS

| 1,683,023 | A | * | 9/1928 | Champion | F16C 1/262 |
| | | | | | 138/106 |
| 6,153,827 | A | * | 11/2000 | Taranto | F16C 1/26 |
| | | | | | 174/135 |
| 2012/0015555 | A1 | * | 1/2012 | Deimel | H05K 9/0018 |
| | | | | | 439/607.41 |
| 2018/0274582 | A1 | * | 9/2018 | Asano | F16C 1/262 |

FOREIGN PATENT DOCUMENTS

| JP | 57020326 | A | * | 2/1982 |
| JP | 2009-138855 | A | | 6/2009 |
| JP | 2015113873 | | * | 6/2015 |
| JP | 2016183744 | A | * | 10/2016 |
| JP | 2016183745 | | * | 10/2016 |

* cited by examiner

*Primary Examiner* — Vicky A Johnson
(74) *Attorney, Agent, or Firm* — Carrier Blackman & Associates, P.C.; William D. Blackman; Joseph P. Carrier

(57) ABSTRACT

In a Bowden cable, a shield thereof is formed from a hollow strand that is formed by twisting a plurality of metal individual wires. An end part of this hollow strand is exposed by removing an outer skin and is increased in diameter, thereby forming a first flare part. An end part of a liner is also increased in diameter to form a second flare part. An end piece is injection molded so as to envelop these flare parts. A synthetic resin as a material of this end piece is made to enter between the metal individual wires. The end piece includes a mounting part and a bent pipe part for covering and surrounding an outer periphery of an outer cable in a state in which the outer cable is curved. The mounting part and the bent pipe part are formed as a unit by injection molding.

15 Claims, 15 Drawing Sheets

FIG.1
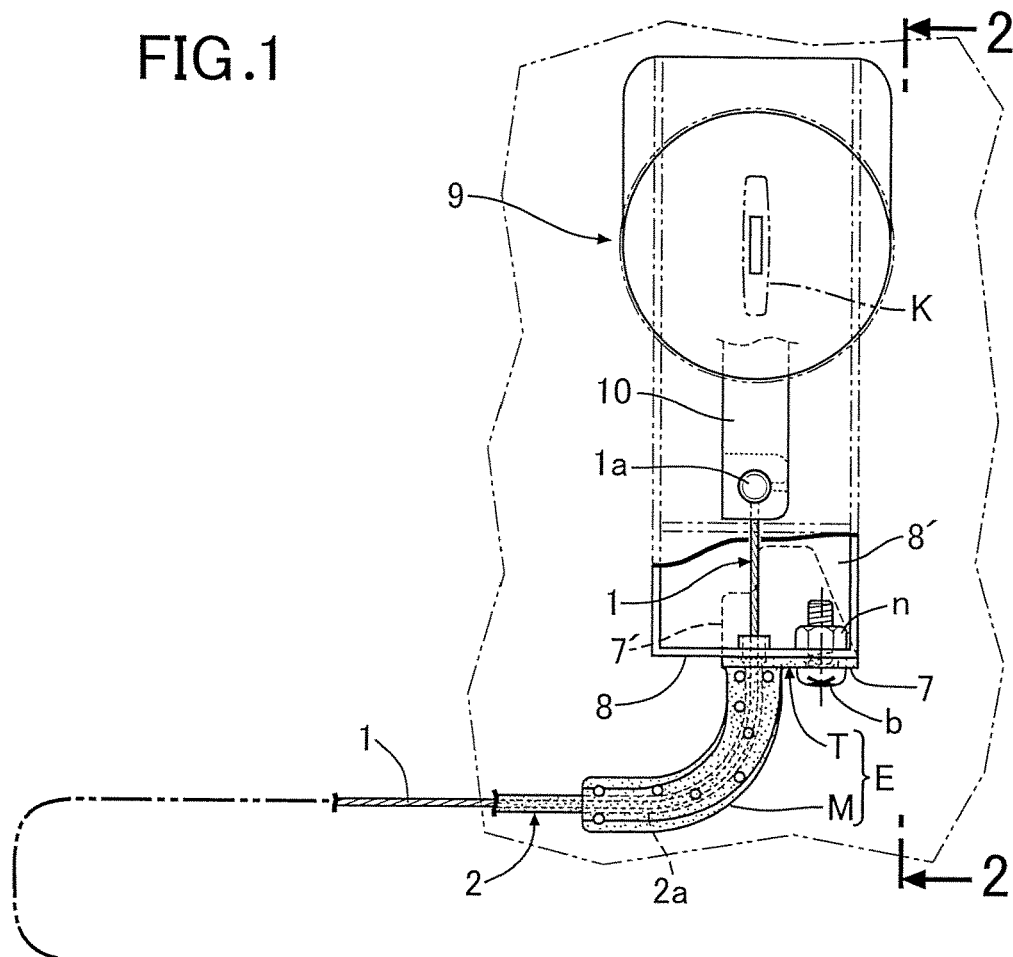
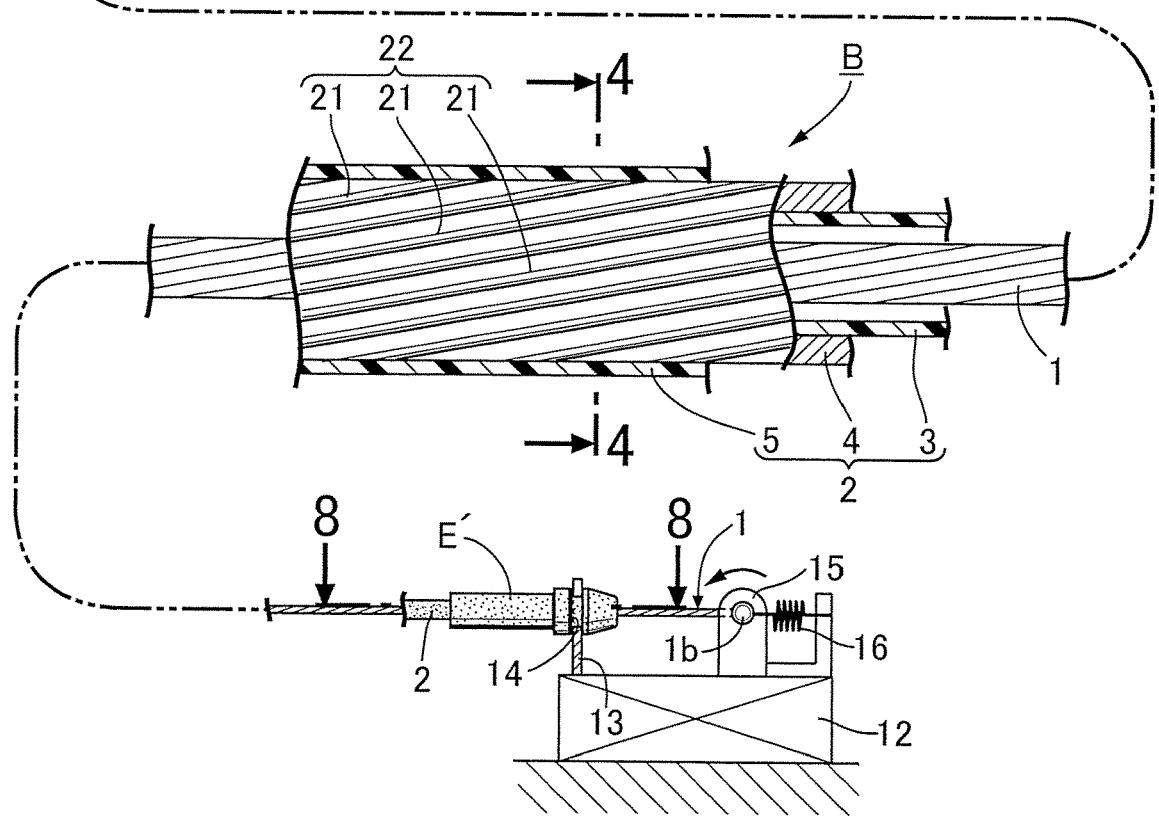

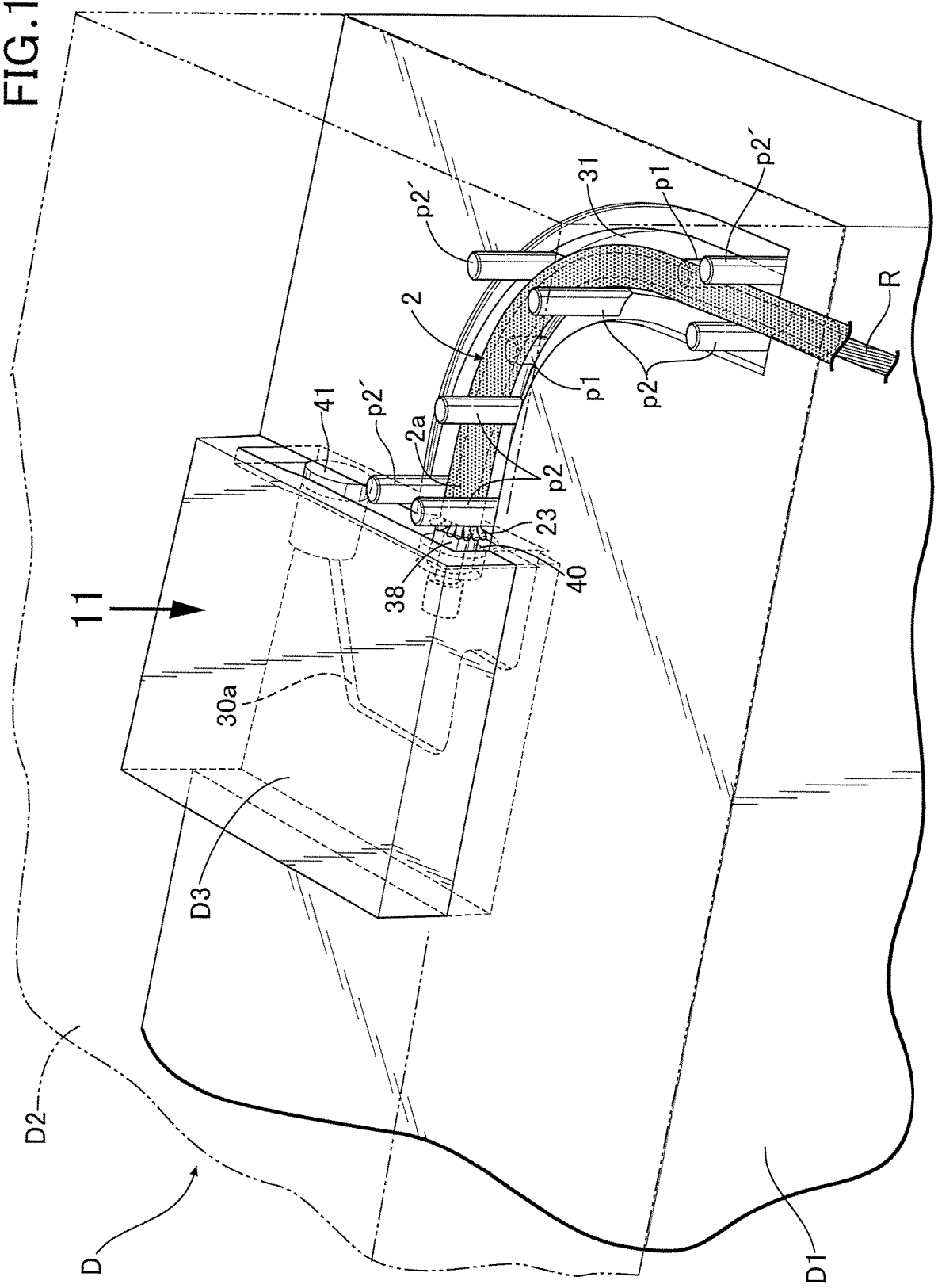

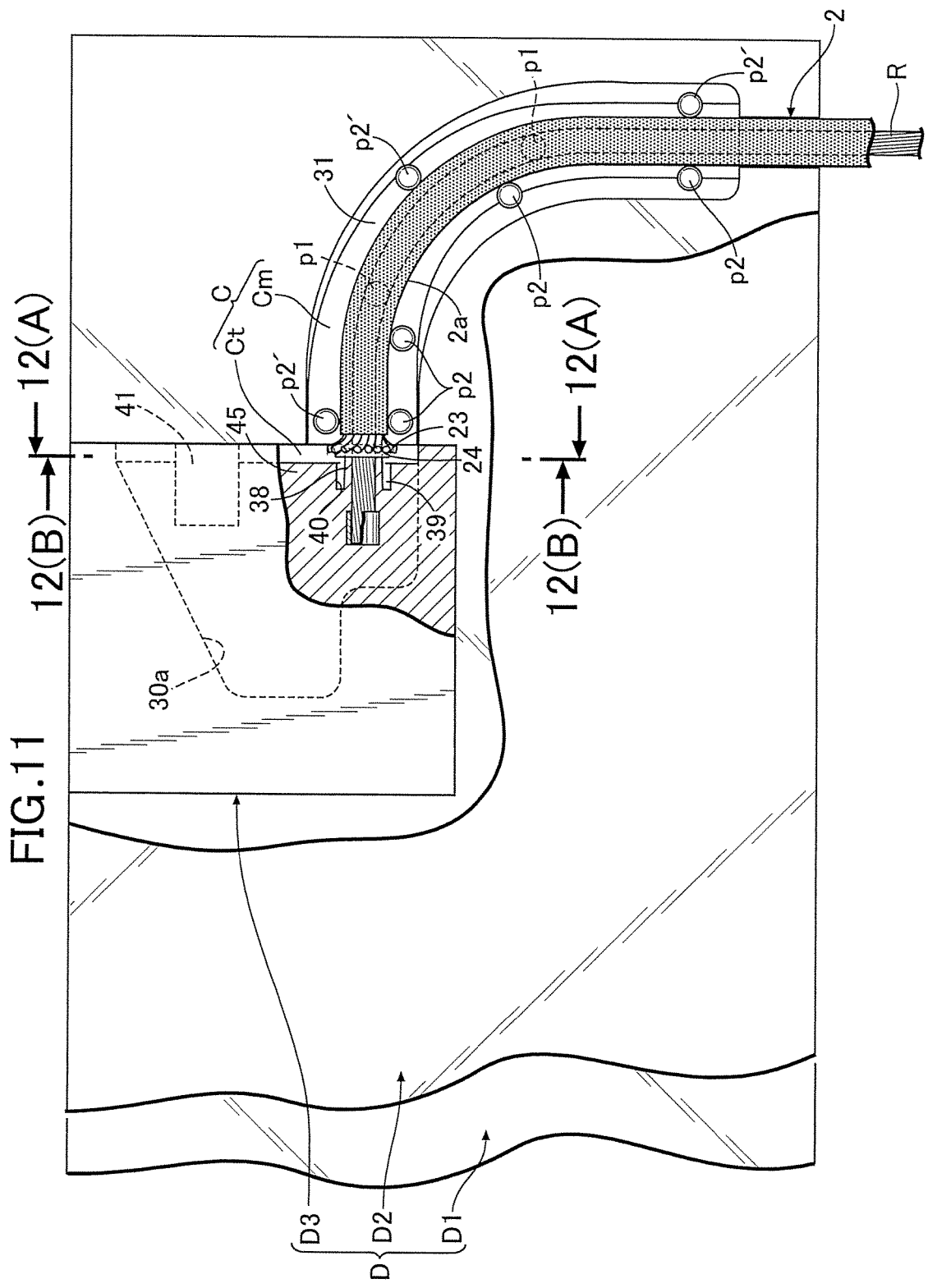

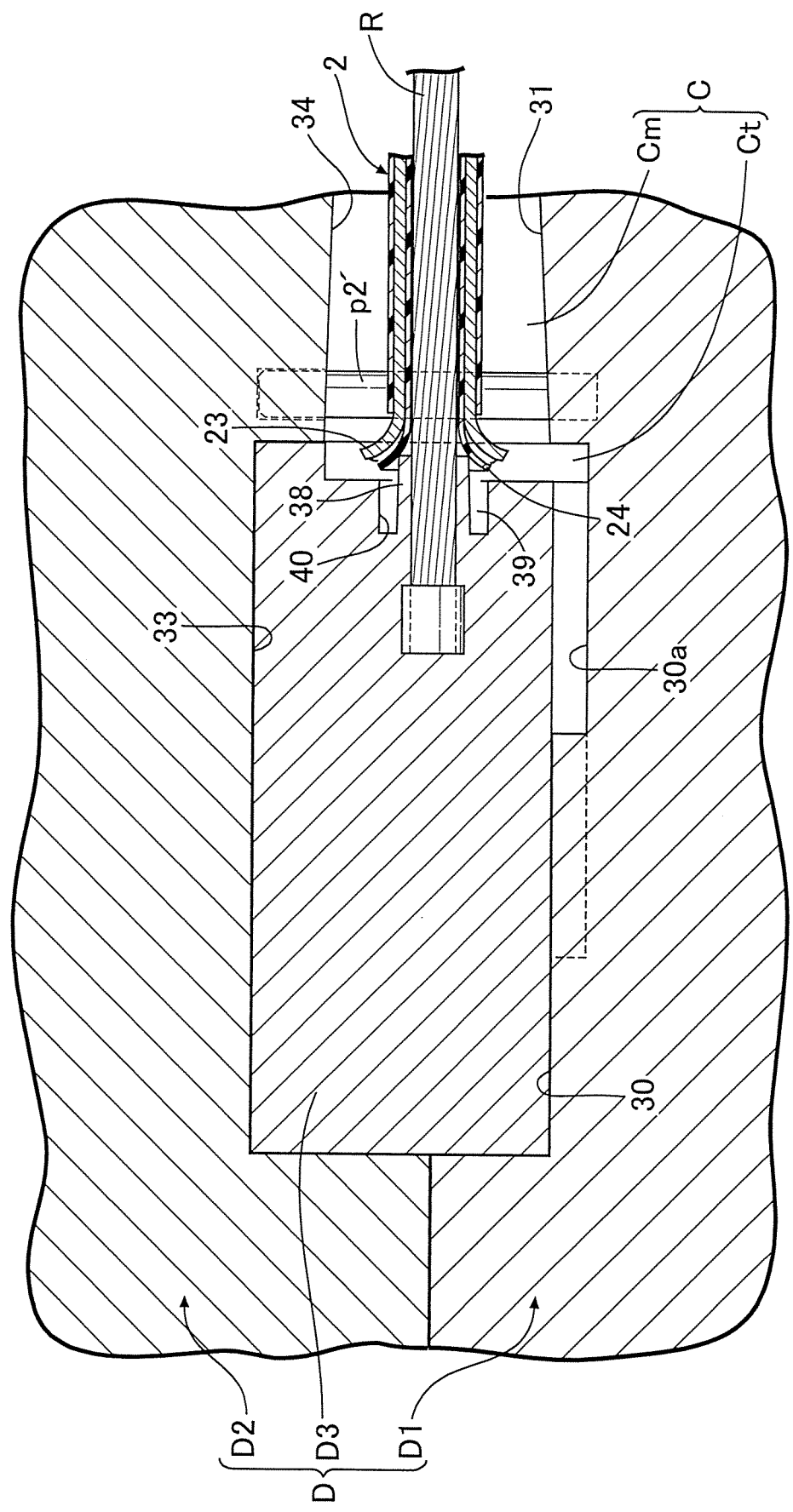

PRIOR ART

CONNECTING STRUCTURE OF END PIECE AND OUTER CABLE IN BOWDEN CABLE AND METHOD FOR CONNECTING THE SAME

CROSS-REFERENCE TO RELATED APPLICATIONS

The present invention is based on Japanese Patent Application No. 2015-064603, filed on Mar. 26, 2015. The entire subject matter of this document, including specification claims and drawings thereof, is incorporated by reference herein.

BACKGROUND OF THE INVENTION

Field of the Invention

The present invention relates to a connecting structure of an end piece and an outer cable in a Bowden cable, the Bowden cable comprising a flexible inner wire, a flexible outer cable that has inserted therethrough the inner wire and guides sliding thereof, and an end piece that is connected to one end portion of the outer cable and has inserted therethrough the inner wire, the outer cable comprising a liner that is made of a synthetic resin and directly guides sliding of the inner wire, a hollow shield that houses and retains the liner, and an outer skin that is made of a synthetic resin and covers an outer periphery of the shield. The present invention also relates to a method for connecting an end piece and an outer cable in order to obtain the connecting structure.

Description of the Related Art

Such a Bowden cable is known as disclosed in Japanese Patent Application Laid-open No. 2009-138855.

FIGS. 15A and 15B show the arrangement of a conventional Bowden cable B'. In these figures, reference numeral 01 is an inner wire, 02 is an outer cable, 03 is a liner, 04 is a shield, and 05 is an outer skin. In this conventional Bowden cable B', the shield 04 is formed by closely winding a metal band plate m around an outer periphery of the liner 03 in a coil shape. When ensuring the minimum strength for such a shield 04, since the metal band plate m has a limitation for the minimum thickness, and the minimum external diameter is restricted from the viewpoint of ease of formation of the coil shape, it is difficult to reduce the diameter of the outer cable 02, and consequently to lighten the weight.

Furthermore, in an end piece of the Bowden cable, when a mounting part and a bent pipe part are produced separately using a metal, the mounting part being used for fixing the end piece on a support member and the bent pipe part covering and retaining the outer cable in a curved state, since it is necessary to connect the two after producing them, it is also necessary to subsequently fit a resin pipe inner into the inner periphery of the metal bent pipe part in order to protect the inner wire and, moreover, it is necessary to connect the metal bent pipe part and the outer cable end part by swaging, the overall number of components and number of processing steps become large, thus causing an increase in the cost and an increase in the weight and, moreover, giving rise to the problem, for example, that a step occurs in the area where the bent pipe part (the resin pipe inner) and the outer cable end part are joined, thus degrading the sliding properties of the inner wire.

SUMMARY OF THE INVENTION

The present invention has been accomplished in light of such circumstances, and it is an object thereof to provide a connecting structure of an end piece and an outer cable in a Bowden cable and a method for connecting an end piece and an outer cable in order to obtain the connecting structure, the structure enabling the diameter of the outer cable to be greatly reduced and the weight to be lightened and enabling the end piece to be made using a synthetic resin and the end piece and a shield to be simply and strongly joined, and the structure being capable of solving the latter problem by enabling the bent pipe part and the mounting part in the end piece to be molded integrally using a synthetic resin.

In order to achieve the object, according to a first aspect of the present invention, there is provided a connecting structure of an end piece and an outer cable in a Bowden cable, the Bowden cable comprising a flexible inner wire, a flexible outer cable that has inserted therethrough the inner wire and guides sliding thereof, and an end piece that is connected to one end portion of the outer cable and has inserted therethrough the inner wire, the outer cable comprising a liner that is made of a synthetic resin and directly guides sliding of the inner wire, a hollow shield that houses and retains the liner, and an outer skin that is made of a synthetic resin and covers an outer periphery of the shield, wherein the shield is formed from a hollow strand that is formed by twisting a plurality of metal individual wires arranged so as to be in intimate contact with each other around the liner, the outer skin is removed to expose an end part of this hollow strand, the end part of this hollow strand is increased in diameter to form a first flare part in which the metal individual wires are separated, an end part of the liner is also increased in diameter to form a second flare part that is adjacent to the first flare part, the end piece is injection molded so as to envelop the first and second flare parts, the synthetic resin as a material of this end piece is made to enter between the metal individual wires, the end piece comprises a mounting part for fixing and supporting the end piece on a support member and a bent pipe part for covering and surrounding an outer periphery of said one end portion of the outer cable in a state in which the outer cable is curved, and the mounting part and the bent pipe part are formed as a unit by said injection molding.

In accordance with the first aspect, since the hollow shield of the Bowden cable is formed from the hollow strand formed by twisting the plurality of metal individual wires arranged around the liner so as to be in intimate contact with each other, it is possible to form the shield with a sufficiently smaller diameter than that of a shield of a conventional Bowden cable using inner wires having an identical diameter, thus making the diameter of the Bowden cable smaller and consequently achieving a light weight. Moreover, since the hollow strand has high tensile and compressive strength and stiffness compared with a conventional shield formed by closely winding a metal band plate into a coil shape, it can sufficiently withstand not only the pulling operation force of the inner wire but also the pushing operation force, the efficiency of transmission of either of the operation forces can be enhanced and, moreover, it has excellent flexibility, thus widening the application thereof. Furthermore, since the outer skin is removed to expose the end part of this hollow strand, the end part of this hollow strand is increased in diameter to form the first flare part in which the metal individual wires are separated, the end part of the liner is also increased in diameter to form the second flare part that is adjacent to the first flare part, the end piece is injection molded so as to envelop the first and second flare parts, and the synthetic resin as a material of this end piece is made to enter between the metal individual wires, the end piece can simply be obtained by injection molding, and the large number of metal individual wires of the first flare part, which are separated, and the second flare part formed by the end part of the liner bite deeply into the end piece to thus exhibit an anchoring effect, thereby increasing effectively the strength with which the end piece and the outer cable are joined.

Moreover, since the end piece includes the mounting part for fixing and supporting it on the support member, and the bent pipe part covering and surrounding the outer periphery of said one end portion of the outer cable in a curved state, and the mounting part and the bent pipe part are formed integrally by injection molding, it becomes possible to mold the end piece having a complicated overall three-dimensional shape that includes the mounting part and the bent pipe part easily with good precision by injection molding using a synthetic resin, and even if the direction in which one end of the Bowden cable is pulled and the direction in which the cable extends from the end piece are different from each other, it is possible to reliably retain the shape of the curve of the outer cable one end portion, which curves so as to conform to the extending direction, by means of the end piece. Furthermore, since it is unnecessary to produce the mounting part and the bent pipe part separately using a metal and join them afterward, and it is also unnecessary to subsequently insert into the inner periphery of the metal bent pipe part a resin pipe inner for protecting the inner wire, it is possible to achieve a large reduction in the number of components and the number of processing steps, thus contributing to a reduction in cost and a lightening of the weight. Moreover, it is possible to extend lengthwise one end portion of the outer cable up to the vicinity of the outer end of the end piece through the bent pipe part in a vertical manner, it is unnecessary to separately connect the resin pipe inner to the end part of the outer cable, and it is possible to avoid any degradation in the sliding properties of the inner wire due to a step in the join section and, consequently, any degradation in the operational feel.

According to a second aspect of the present invention, in addition to the first aspect, a gap is provided between the first and second flare parts, the synthetic resin entering the gap.

In accordance with the second aspect, due to the gap, into which the synthetic resin enters, being provided between the first and second flare parts, the first and second flare parts bite independently and deeply into the end piece to thus exhibit a strong anchoring effect, thereby further enhancing the strength with which the end piece and the outer cable are joined.

According to a third aspect of the present invention, in addition to the second aspect, the second flare part is formed so as to have a smaller diameter than that of the first flare part.

In accordance with the third aspect, due to the second flare part being formed so as to have a smaller diameter than that of the first flare part, when molding the end piece, the synthetic resin easily enters between the metal individual materials of the first flare part and between the first and second flare parts, thus further enhancing the anchoring effect of the first and second flare parts on the end piece.

According to a fourth aspect of the present invention, there is provided a method for connecting an end piece and an outer cable in a Bowden cable in order to obtain the connecting structure of an end piece and an outer cable in a Bowden cable according to any one of the first to third aspects, wherein a cavity having at least a mounting part-molding cavity part and a bent pipe part-molding cavity part for molding the mounting part and the bent pipe part respectively are formed between a plurality of molding elements dividedly forming a molding device used in said injection molding, and said injection molding is carried out so that a synthetic resin in a molten state is injected into the cavity in a state in which said one end portion of the outer cable is fitted into at least the bent pipe part-molding cavity part of the cavity and a shape-retaining core material having flexibility is inserted into the liner of the outer cable.

In accordance with the fourth aspect, since in a state in which one end portion of the outer cable is inserted into at least the bent pipe part-molding cavity part of the cavity of the molding device used for said injection molding and the shape-retaining core material having flexibility is inserted into the liner of the outer cable, a synthetic resin in a molten state is injected into the cavity, the injection molding pressure can be withstood sufficiently by the shape-retaining core material and, therefore, collapsing or deformation of the outer cable due to high molding pressure can be prevented effectively by means of the shape-retaining core material even when for example the outer cable has a relatively small diameter and low stiffness or when a flat thin part is formed in the outer skin due to the outer cable being bent, thus enhancing the sliding properties of the inner wire in a state in which the inner wire is inserted through the outer cable after molding, and consequently the operational feel.

According to a fifth aspect of the present invention, in addition to the fourth aspect, a base end of the shape-retaining core material is joined to at least some of the molding elements, and the shape-retaining core material is inserted into the liner of the outer cable prior to said injection molding from an extremity side of the shape-retaining core material.

In accordance with the fifth aspect, since the base end of the shape-retaining core material is joined to at least some of the molding elements, and the shape-retaining core material is inserted into the liner of the outer cable prior to injection molding from the extremity side of the shape-retaining core material, the base end of the shape-retaining core material can be put in advance in a state in which it is connected to some of the molding elements, and the operation of positioning and setting the shape-retaining core material on the molding device can be carried out efficiently.

According to a sixth aspect of the present invention, in addition to the fourth or fifth aspect, at least some of the molding elements are provided with a plurality of positioning projections for centering, in cooperation with each other, said one end portion of the outer cable with respect to the bent pipe part-molding cavity part in a state in which said one end portion of the outer cable is fitted into the bent pipe part-molding cavity part of the cavity, and said one end portion of the outer cable is correctly positioned and retained at a predetermined set position of the bent pipe part-molding cavity part during said injection molding by means of the positioning projections.

In accordance with the sixth aspect, since at least some of the molding elements are provided with the plurality of positioning projections for centering, in cooperation with each other, one end portion of the outer cable with respect to the bent pipe part-molding cavity part in a state in which said one end portion of the outer cable is fitted into the bent pipe part-molding cavity part of the cavity, said one end portion of the outer cable is correctly positioned and retained at a predetermined set position of the bent pipe part-molding cavity part during said injection molding by means of the positioning projections, and the bent pipe part of the end piece can be disposed and fixed around the centered outer cable in an appropriate concentric attitude, and the molding properties of the bent pipe part become good.

The above and other objects, characteristics and advantages of the present invention will be clear from detailed descriptions of the preferred embodiment which will be provided below while referring to the attached drawings.

BRIEF DESCRIPTION OF THE DRAWINGS

FIG. 1 is a partially cutaway side view showing a Bowden cable related to an embodiment of the present invention and an application example thereof.

FIG. 10 is a perspective view showing a state in which a middle die and a shape-retaining core material are set between an upper die and a lower die during injection molding of the end piece.

FIG. 11 is a plan view in which part of the upper die and the middle die is cut away, showing a state in which the middle die and the shape-retaining core material are set on the lower die between the upper and lower dies (a partially cutaway sectional view from arrow 12 in FIG. 10).

FIG. 14 is a sectional view along line 14-14 in FIG. 13.

DESCRIPTION OF THE PREFERRED EMBODIMENT

Figure 4:
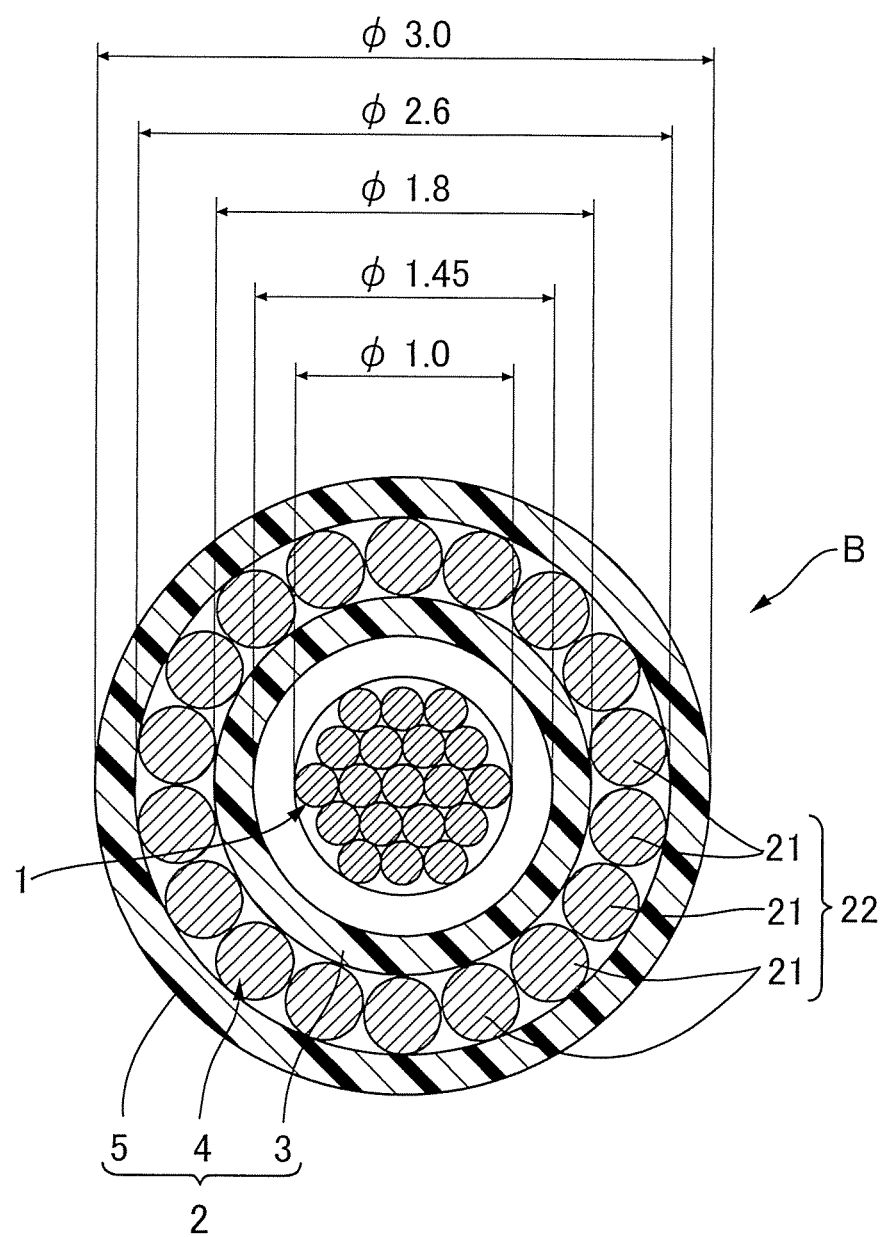
FIG. 4 is a transverse sectional view (enlarged sectional view along line 4-4 in FIG. 1) of a Bowden cable intermediate part.
Figure 5:
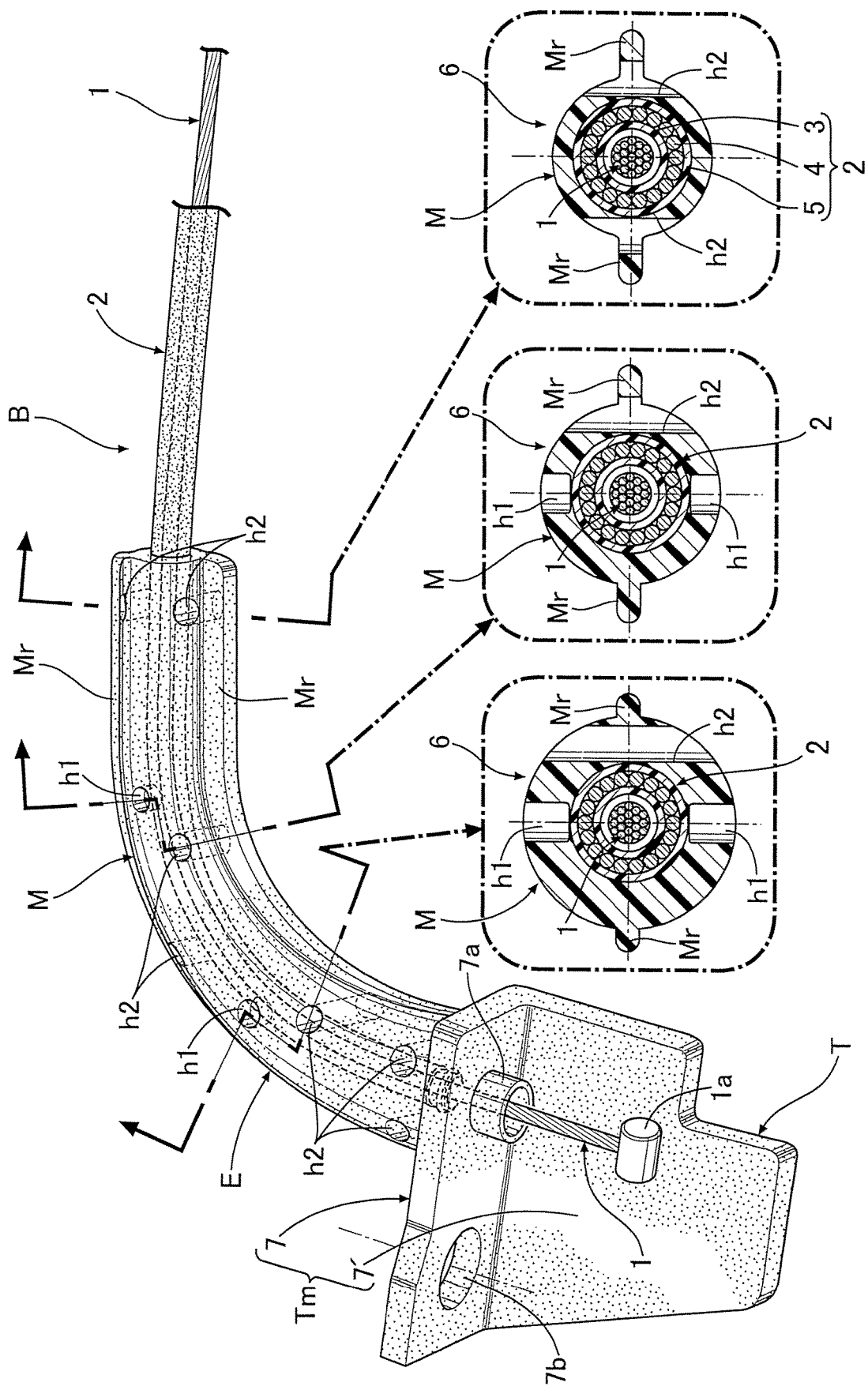
FIG. 5 is a perspective view of an end piece in a Bowden cable end part.

In FIG. 1 and FIG. 4, a Bowden cable B is formed from a flexible inner wire 1, a flexible outer cable 2 that has the inner wire 1 inserted therethrough and guides the sliding thereof, and end pieces E and E' that are joined to opposite end parts of the outer cable 2, the outer cable 2 being formed from a liner 3 that is made of a synthetic resin and directly guides sliding of the inner wire 1, a hollow shield 4 that houses and retains the liner 3, and an outer skin 5 that is made of a synthetic resin and covers the outer periphery of the shield 4. Connecting terminals 1a and 1b formed into a columnar shape that is orthogonal to the inner wire 1 are fixed afterward to opposite ends, projecting outside the outer cable 2, of the inner wire 1.

Figure 2:
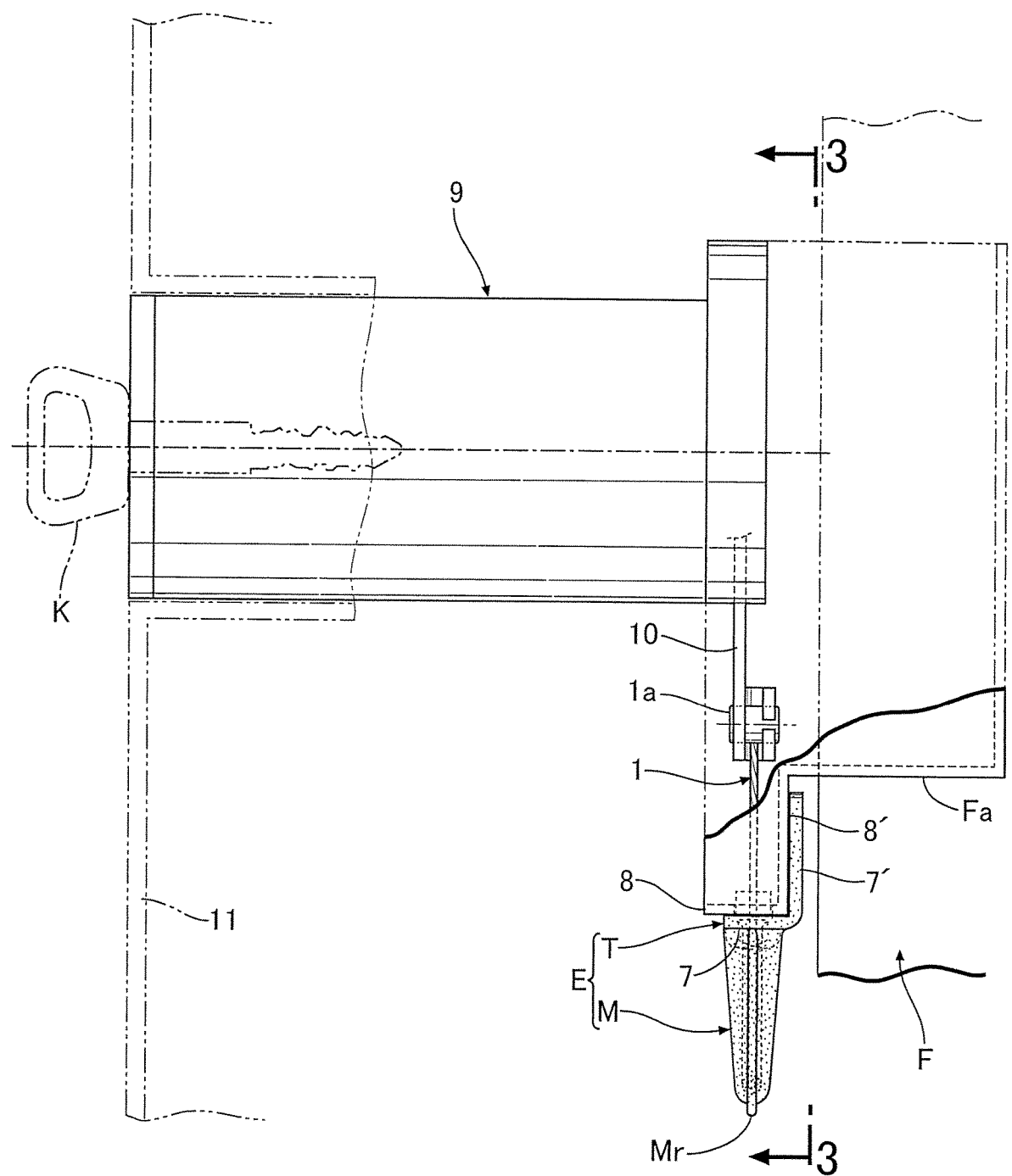
FIG. 2 is an enlarged sectional view along line 2-2 in FIG. 1.
Figure 3:
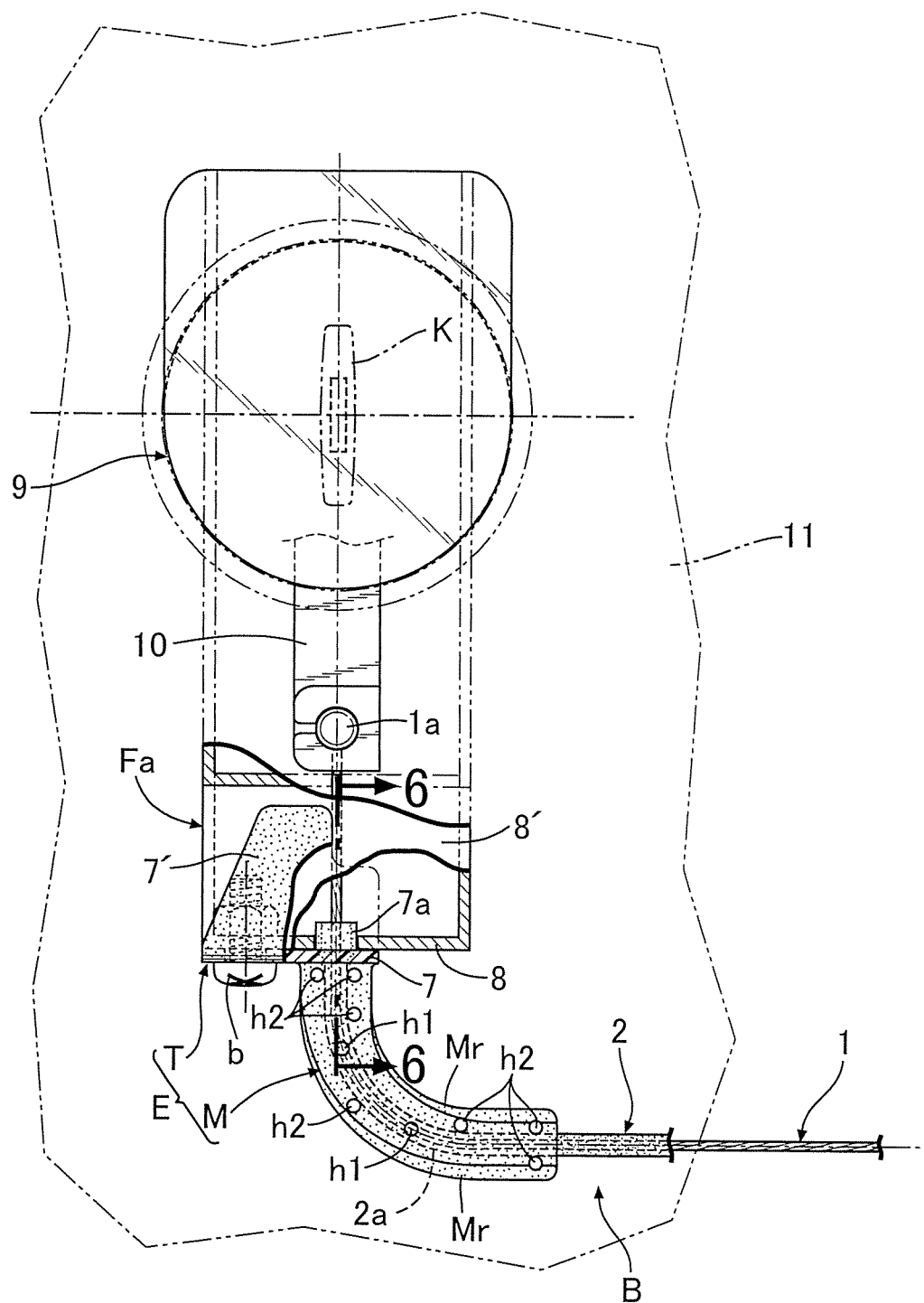
FIG. 3 is an enlarged sectional view along line 3-3 in FIG. 2.

Referring in addition to FIGS. 2 and 3, the Bowden cable B is applied to for example a lock release device of a seat lock-operating mechanism of a two-wheeled motor vehicle.

The end piece E on the operation side includes a bracket T and a curved cylindrical bent pipe part M, the bracket T being a mounting part fixing and supporting the end piece E on a support member Fa fixed to an appropriate position of a vehicle body frame F of the two-wheeled motor vehicle, and the bent pipe part M covering and surrounding the outer periphery of one end portion 2a of the outer cable 2 in a state in which it is curved. The bracket T and the bent pipe part M are formed integrally with each other at the same time when injection molding the end piece E using a synthetic resin as described later. The bent pipe part M may have as part thereof a straight pipe portion or may be curved over its entirety.

With regard to the bent pipe part M of the end piece E on the operation side, the end connected to the bracket T in the illustrated example, that is, the portion where stress concentration most easily occurs, is formed so as to have the largest diameter and the largest thickness, and in going away therefrom it is formed so as to gradually have a smaller diameter and a smaller thickness. Furthermore, a pair of left and right reinforcing ribs Mr are integrally and projectingly provided on the outer periphery of the bent pipe part M so as to extend from midway in the longitudinal direction to the small diameter end. A plurality of marks h1 and h2 that are left when pulling positioning projections p1 and p1'; p2 and p2' for centering the outer cable 2 are formed as scattered points on the bent pipe part M, the marks h1 and h2 being caused during the injection molding process, which is described later.

The bracket T as a mounting part includes as a main body an L-shaped bracket main body Tm in which first and second mounting walls 7 and 7' orthogonal to each other in the present embodiment are integrally formed, these first and second mounting walls 7 and 7' abutting against mutually orthogonal first and second support walls 8 and 8' of the support member Fa and being fastened by a nut n and a bolt b extending through the first mounting wall 7. A cylindrical projection 7a and a bolt insertion hole 7b are formed in the first mounting wall 7, the cylindrical projection 7a being fitted into and engaged with an engagement hole of the first support wall 8, and the bolt b being inserted through the bolt insertion hole 7b.

A lock-operating mechanism 9 is mounted on the support member Fa, the lock-operating mechanism 9 including a cylinder lock that enables the Bowden cable B to be pulled by means of a key K being inserted and rotated; one connecting end portion 1a of the inner wire 1 of the Bowden cable B is linked to an output member 10 of the operating mechanism 9, and the output member 10 moves upward in response to the key K being rotated, thus enabling the inner wire 1 to be pulled. In FIG. 2, reference numeral 11 is a cowl for covering the vehicle body frame F, the lock-operating mechanism 9, etc. for good appearance.

Furthermore, an annular latching groove 14 is provided in the outer periphery of the end piece E' on the operated side, the latching groove 14 being latched on a bracket 13 of a seat lock-operating mechanism 12 disposed immediately beneath a seat of the two-wheeled motor vehicle. The other connecting terminal 1b of the inner wire 1 is connected to a lock release lever 15 of the seat lock-operating mechanism 12, this lock release lever 15 being urged and retained at a retracted position, that is a locked position, by means of the urging force of a return spring 16.

Inserting the key K into the key hole of the lock-operating mechanism 9 and pivoting it in the lock release direction to thus pull the inner wire 1 by means of the output member 10 makes the lock release lever 15 pivot against the urging force of the return spring 16, thus enabling a locked state of the seat lock-operating mechanism 12 to be released and enabling the seat, which is not illustrated, to be opened. If the key K is pivoted back in the locking direction the lock release lever 15 is pivoted by means of the urging force of the return spring 16, thus enabling the seat lock-operating mechanism 12 to be returned to the locked state.

The shield 4 is formed from a hollow strand 22 formed by twisting a plurality of metal individual wires 21 arranged around the liner 3 so as to be in intimate contact with each other.

FIG. 4 shows an example of a design of the Bowden cable B when the inner wire 1 used has a diameter of 1.0 mm. The diameter of the metal individual wires 21 is 0.4 mm, the number of metal individual wires 21 is 18, the twist pitch of the metal individual wires 21 is 47 to 53 mm, the twist method of the metal individual wires 21 is S twist, the external diameter of the shield 4 is 2.6 mm, and the weight is 21 g/m.

Figure 15A:
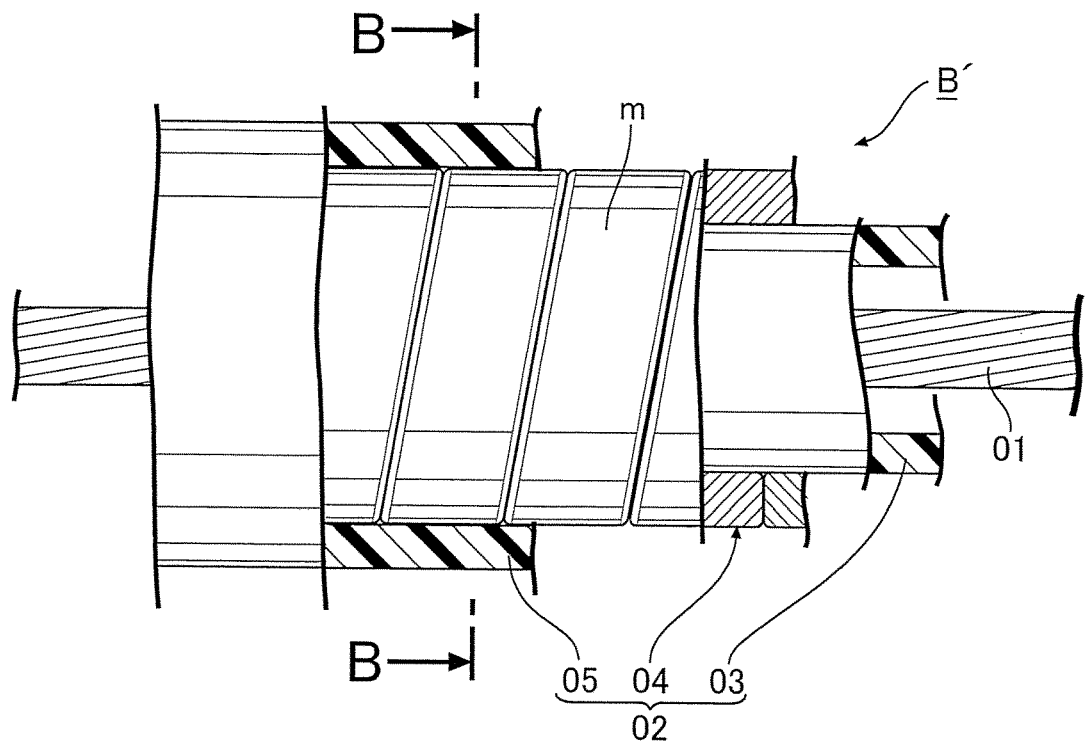
FIG. 15A is a partially cutaway side view showing a conventional Bowden cable.
Figure 15B:
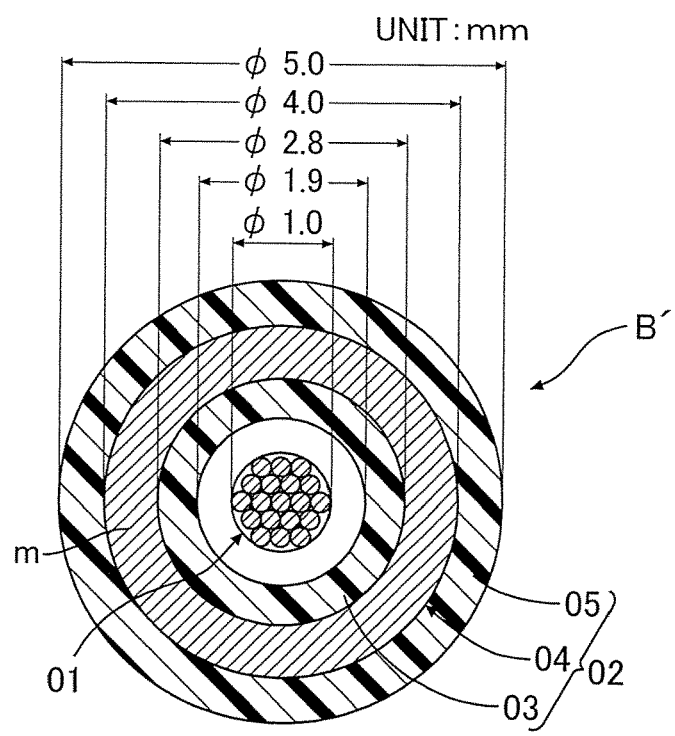
FIG. 15B is a sectional view of an intermediate part thereof.

For comparison therewith, an example of a design of a conventional Bowden cable B' when the diameter of the inner wire 1 used is 1.0 mm is shown in FIGS. 15A and 15B. In this case, the plate thickness of a metal band plate m that is closely wound into a coil shape in order to form a shield 04 is 0.5 mm, the external diameter of the shield 04 is 4.0 mm, and the weight is 62 g/m.

A point to be noted in the above is the difference between a thickness of 0.4 mm (=diameter of metal individual wires 21) and an external diameter of 2.6 mm of the shield 4 of the present invention and a thickness of 0.5 mm (=plate thickness of metal band plate m) and an external diameter of 4.0 mm of the shield 04 of the conventional product.

An external diameter of 4.0 mm for the shield 04 (see FIGS. 15A and 15B) of the conventional product is the limit in terms of formation by closely winding the metal band plate m having a plate thickness of 0.5 mm into a coil shape; in order to set the external diameter at less than 4.0 mm, it is necessary to set the plate thickness of the metal band plate m at less than 0.5 mm, but by so doing it becomes difficult to satisfy the strength for the shield 04.

On the other hand, the reason that the external diameter of the shield 4 of the present invention could be made much smaller than the external diameter of the shield 04 of the conventional product is because the hollow strand 22 is formed by twisting the plurality of metal individual wires 21 having a diameter of 0.4 mm so as to be arranged around the liner 3 in intimate contact with each other, thus forming the shield 4 therewith.

In accordance with such reduction in the diameter of the shield 4 of the present invention (about 1/1.5 of the conventional product), the diameter of the Bowden cable B can be made small, and consequently the weight can be lightened (the weight being about ⅓ of that of the conventional product). Moreover, since the shield 4, which is formed from the hollow strand 22, has high tensile and compressive strength and stiffness compared with the shield 04 of the conventional product formed by closely winding the metal band plate m into a coil shape, it can sufficiently withstand not only the pulling operation force of the inner wire 1 but also the pushing operation force, the efficiency of transmission of either of the operation forces can be enhanced and, moreover, it has excellent flexibility, thus rendering it suitable for a very wide range of applications.

By referring in addition to FIG. 5 to FIG. 9, the end pieces E and E', made of a synthetic resin, and the structure via which they are joined to the outer cable 2 are now explained.

Figure 9:
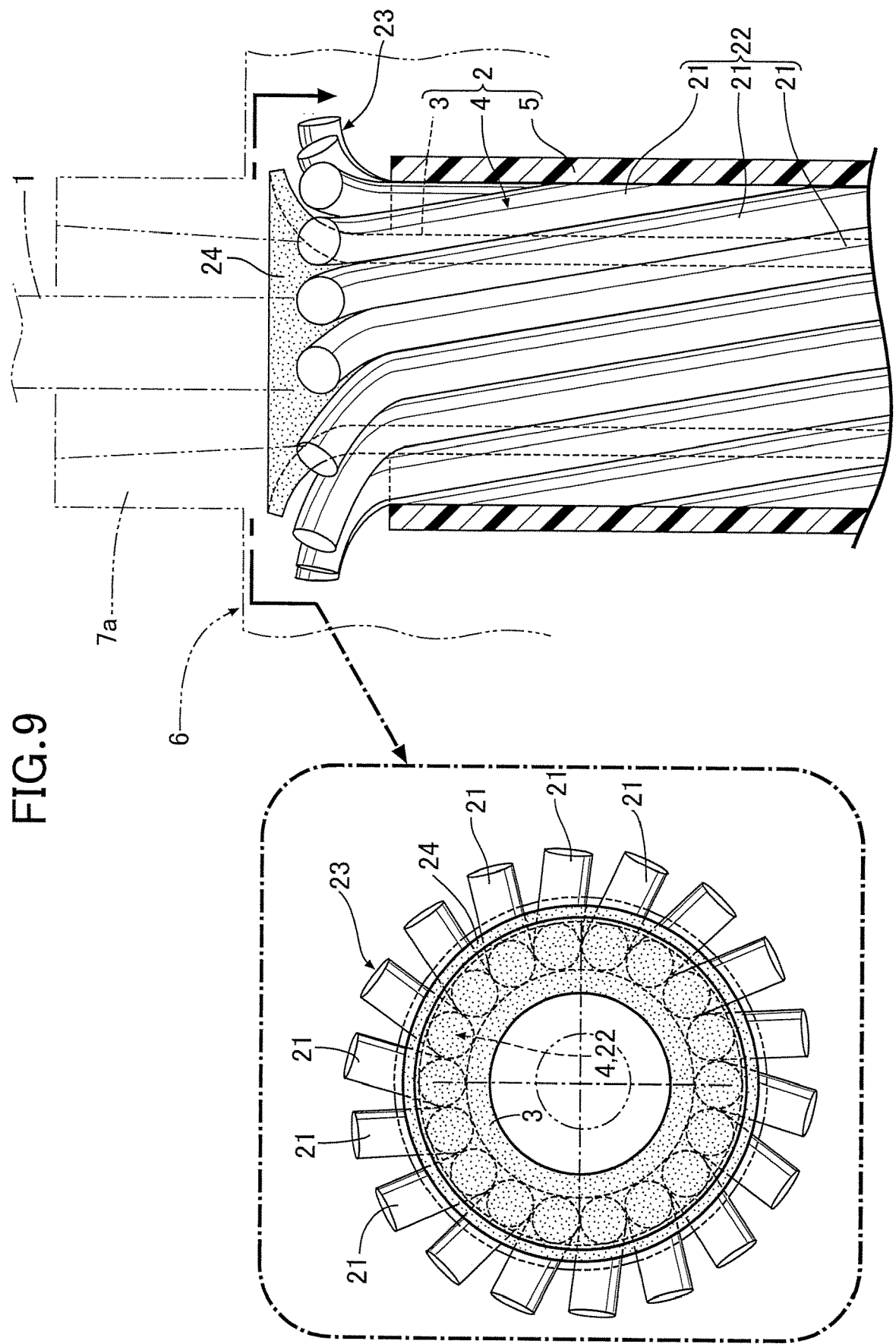
FIG. 9 is an enlarged side view and end face view of one end portion of an outer cable before molding the end piece.
Figure 12A:
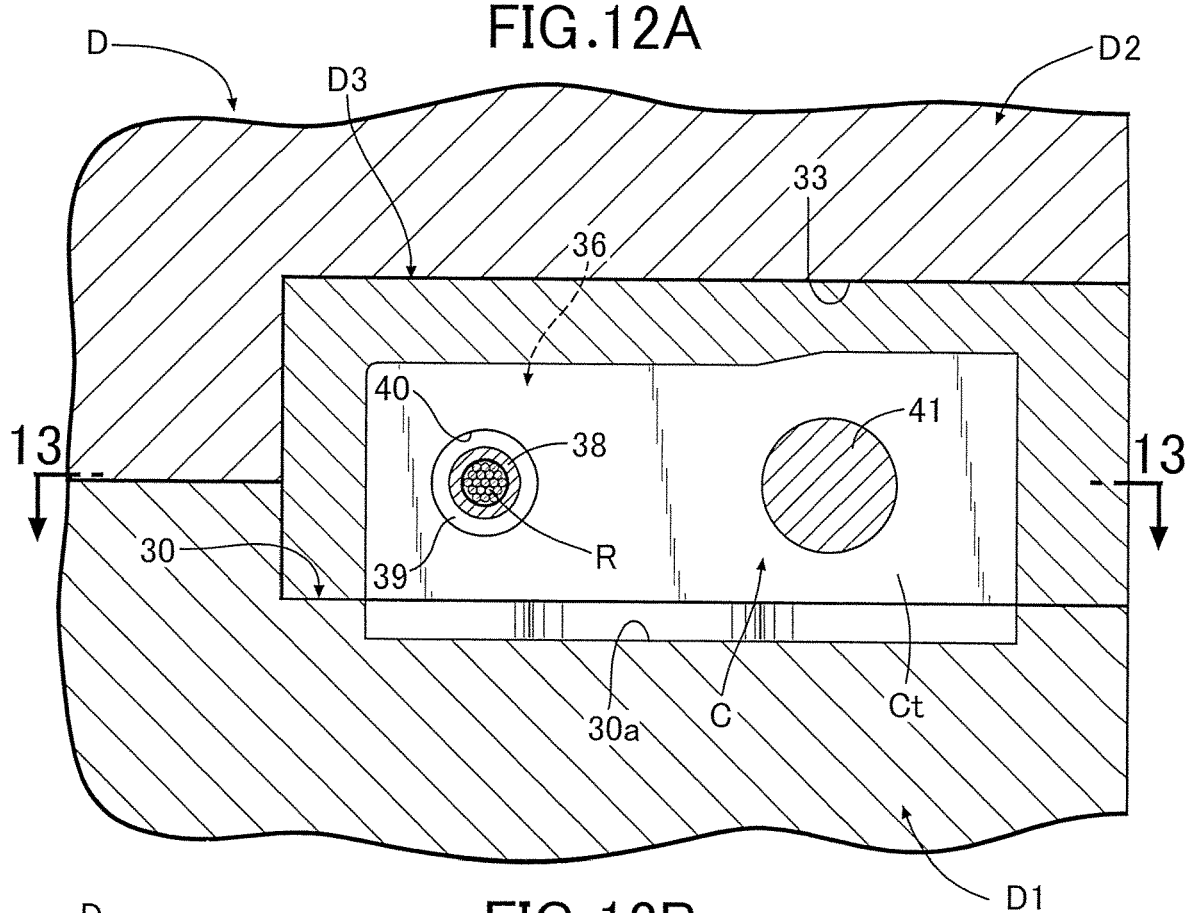
FIG. 12A is a sectional view along line 12(A)-12(A) in FIG. 11.
Figure 12B:
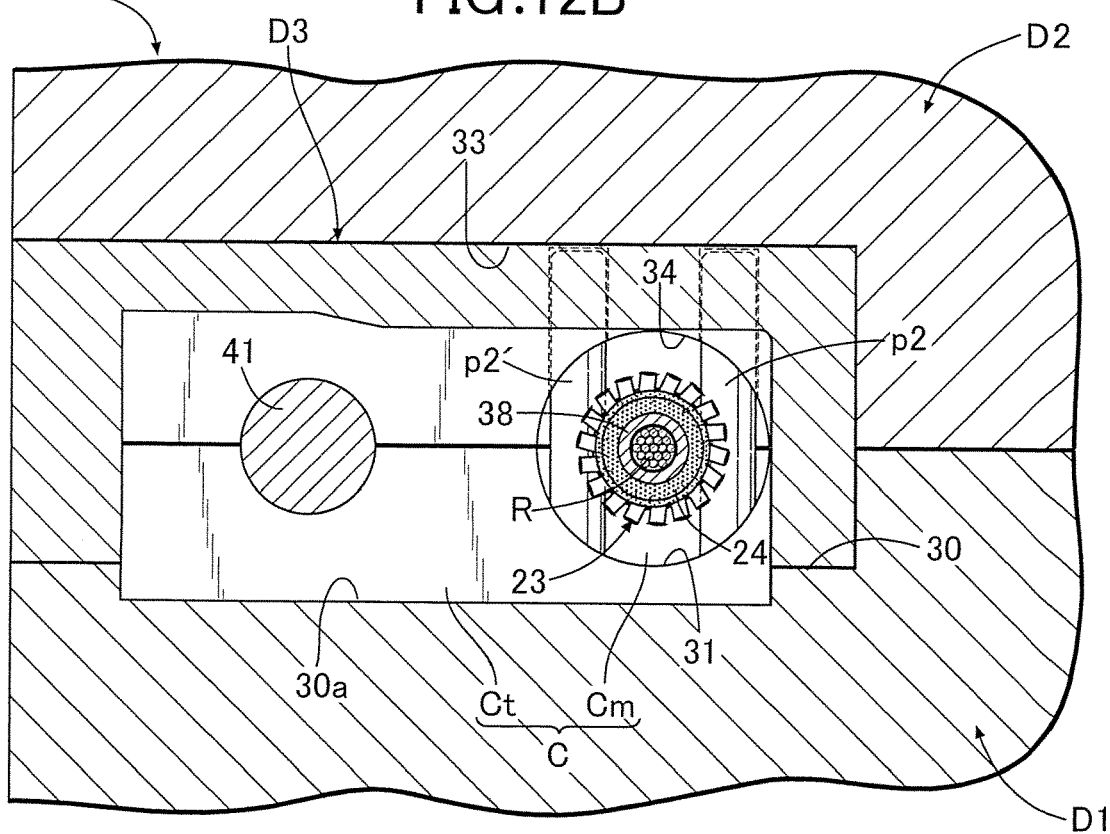
FIG. 12B is a sectional view along line 12(B)-12(B) in FIG. 11.
Figure 13:
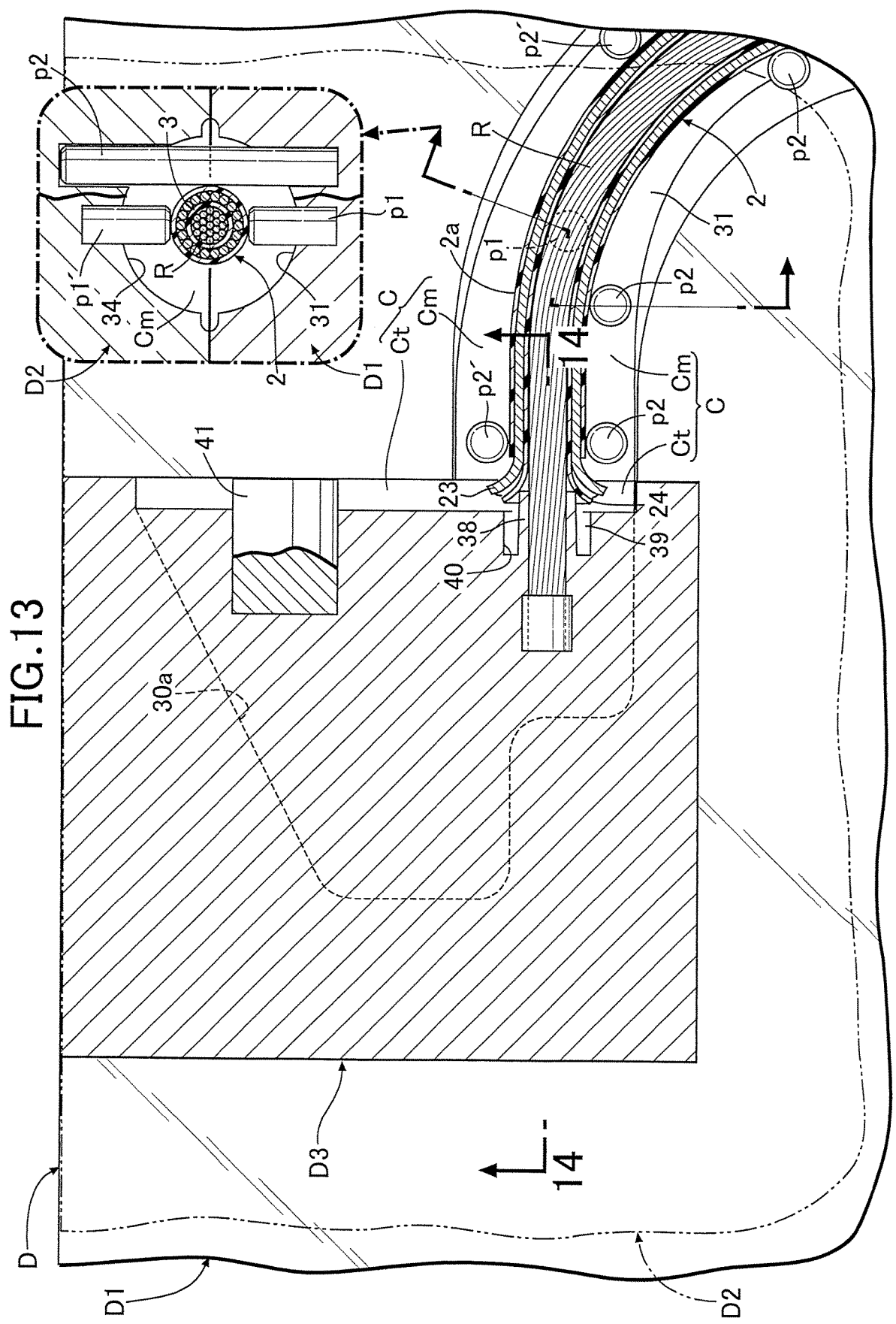
FIG. 13 is a sectional view along line 13-13 in FIG. 12A.

First, as shown in FIG. 9, a first flare part 23 in which the metal individual wires 21 are separated is formed by removing the outer skin 5 from opposite end parts of the outer cable 2 so as to expose an end part of the hollow strand 22 and by increasing the diameter of the end part of the hollow strand 22. A second flare part 24 adjacent to the first flare part 23 is also formed by increasing the diameter of an end part of the liner 3. The second flare part 24 is formed so as to have a smaller diameter than that of the first flare part 23 and a gap is provided between the second flare part 24 and the first flare part 23.

Figure 6:
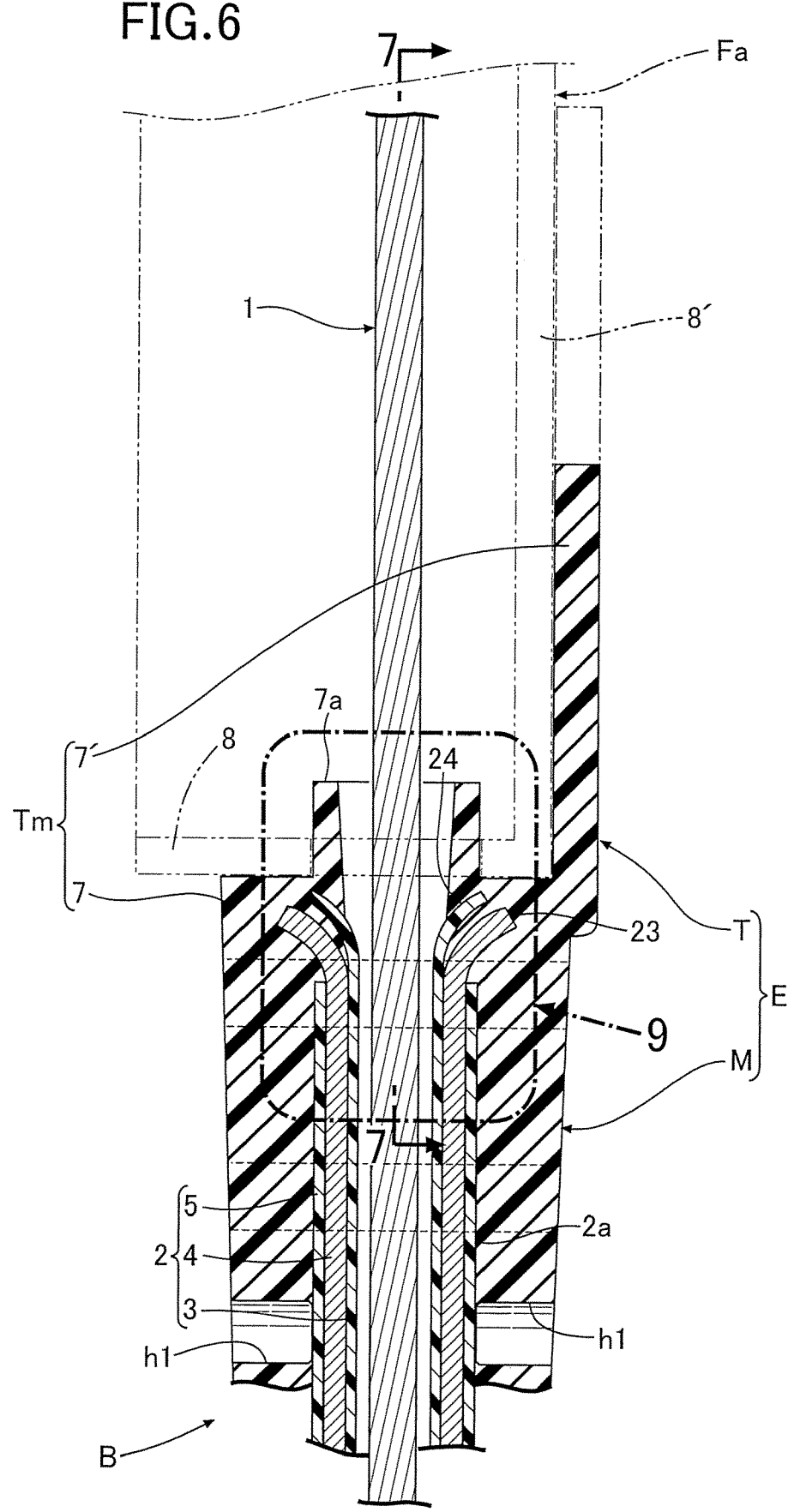
FIG. 6 is an enlarged sectional view along line 6-6 in FIG. 3.
Figure 7:
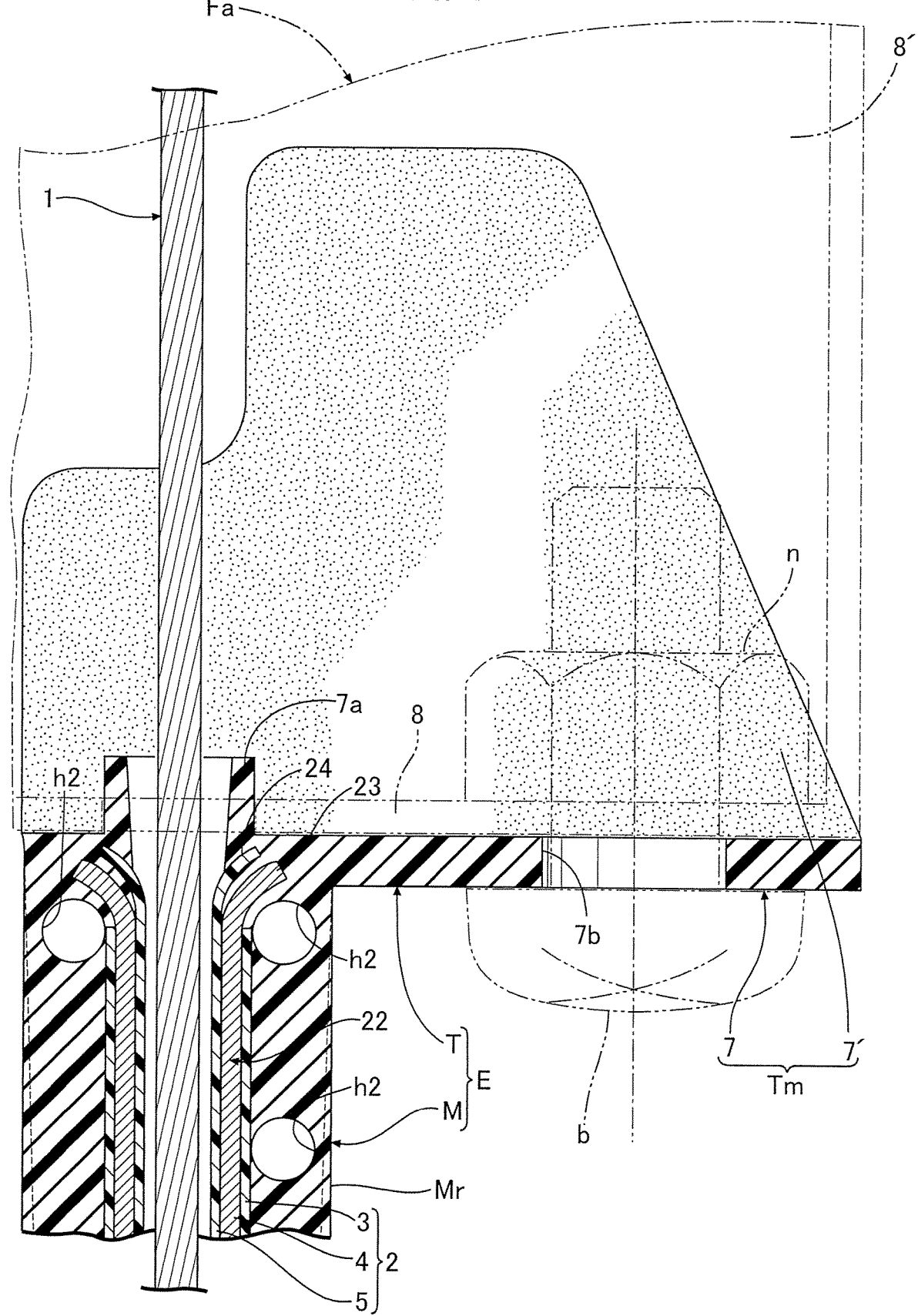
FIG. 7 is a sectional view along line 7-7 in FIG. 6.
Figure 8:
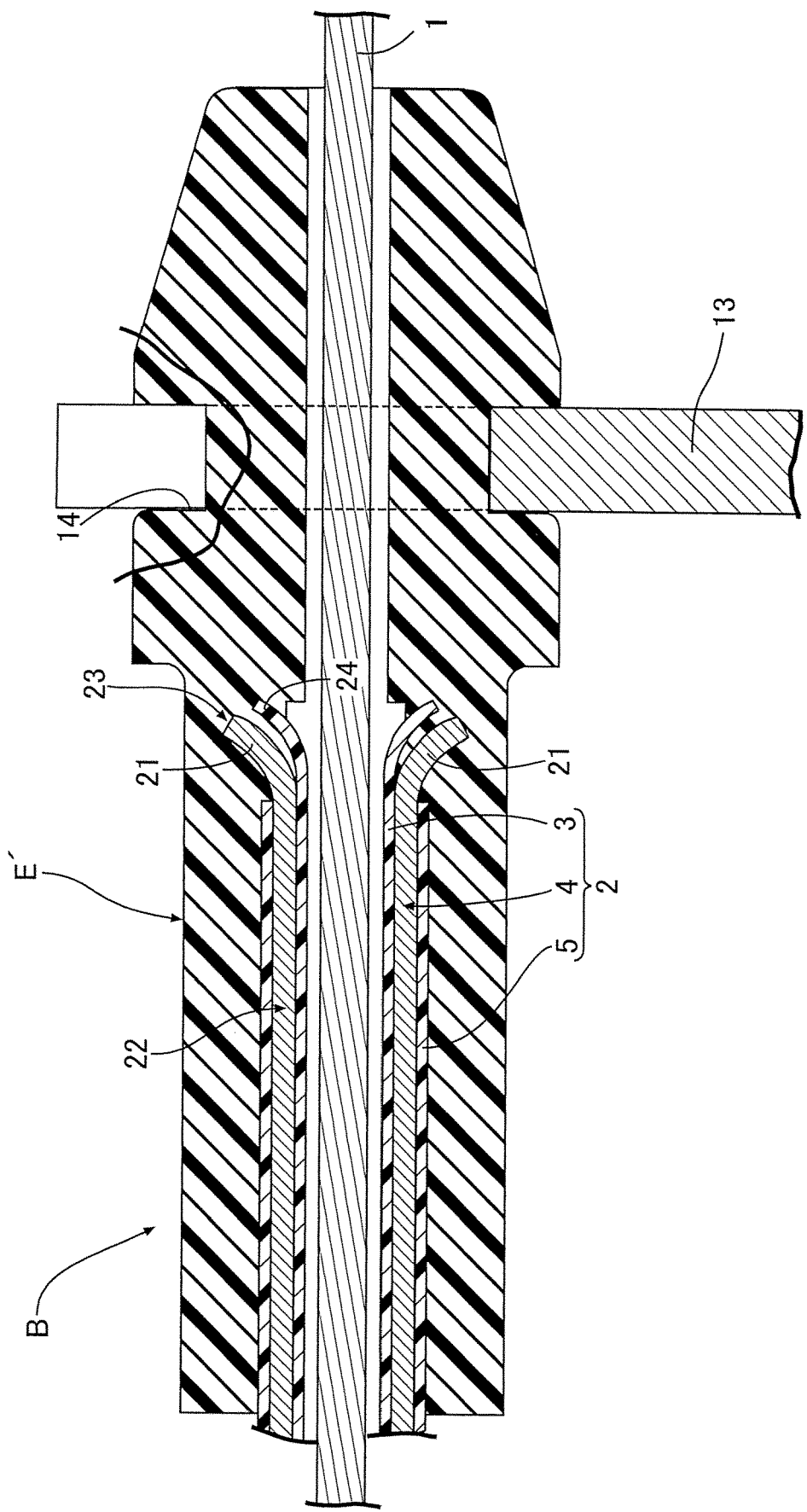
FIG. 8 is an enlarged sectional view along line 8-8 in FIG. 1.

As shown in FIGS. 6 and 8, the end pieces E and E' are injection molded using as a material a synthetic resin so as to envelop the end parts of the first and second flare parts 23 and 24 and the outer skin 5. In this process, the synthetic resin enters between the metal individual wires 21 forming the first flare part 23 and enters the gap between the first and second flare parts 23 and 24.

In this way, the end pieces E and E' can simply be obtained by injection molding. Moreover, the large number of metal individual wires 21 of the first flare part 23, which are separated, and the second flare part 24 formed by the end part of the liner 3 bite deeply into the end pieces E and E' to thus exhibit a strong anchoring effect, thereby increasing the strength with which the end pieces E and E' and the outer cable 2 are joined. Furthermore, due in particular to the gap, into which the synthetic resin enters, being provided between the first and second flare parts 23 and 24, the first and second flare parts 23 and 24 bite independently and deeply into the end pieces E and E' to thus exhibit a strong anchoring effect, thereby further enhancing the strength with which the end pieces E and E' and the outer cable 2 are joined. Moreover, due to the second flare part 24 being formed so as to have a smaller diameter than that of the first flare part 23, when molding the end pieces E and E', the synthetic resin easily enters between the metal individual wires 21 of the first flare part 23 and between the first and second flare parts 23 and 24, thus further enhancing the anchoring effect of the first and second flare parts 23 and 24 on the end pieces E and E'.

As in this embodiment, due to the hollow strand 22 being formed as one layer, the thickness of the shield 4 can made to be the diameter of the metal individual wires 21, thereby greatly contributing to reduction of the diameter of the Bowden cable B, and consequently lightening of the weight. Moreover, the strength with which the end pieces E and E' and the outer cable 2 are joined can be enhanced without changing the shape and dimensions of the conventional end pieces E and E', and it is promising for application in various types of operating force transmission system in a two-wheeled motor vehicle where lightening of the weight, and consequently low fuel consumption, is particularly required.

The end piece E on the operation side in particular includes the bracket T as a mounting part for fixing and supporting it on the support member Fa as described above and the bent pipe part M covering and surrounding the outer periphery of said one end portion 2a of the outer cable 2 in a curved state, has a complicated overall three-dimensional shape, and is insert molded so that said one end portion 2a of the outer cable 2 is embedded, and it therefore requires a special device for the molding thereof. One example of a method for injection molding the end piece E on the operation side is now explained by reference in addition to FIG. 10 to FIG. 13.

A molding device D used for said injection molding is dividedly formed from a plurality of molding elements, for example, a lower die D1, an upper die D2 that can be driven up and down with respect to the lower die D1 by drive means (not illustrated), and a middle die D3 that can be disposed between the upper and lower dies D1 and D2. A cavity C corresponding to the overall shape of the end piece E is formed between the lower die D1, upper die D2, and middle die D3. This cavity C includes at least a bracket-molding cavity part Ct and a bent pipe part-molding cavity part Cm molding the bracket T and the bent pipe part M respectively.

Formed in an upper face (that is, a face mating with the upper die D2) of the lower die D1 are an engagement recess 30 into which a lower end part of the middle die D3 is fitted and a first curved recess 31 for molding a lower half of the bent pipe part M. Furthermore, formed in the engagement recess 30 is a molding recess 30a for molding the bracket T in cooperation with the middle die D3 and the upper die D2.

Formed in a lower face of the upper die D2 are a recess 33 that receives an upper part of the middle die D3 set on the lower die D1 and a second curved recess 34 for molding an upper half of the bent pipe part M. The lower die D1, the middle die D3 set on the lower die D1, and the upper die D2 covering the middle die D3 define the bracket-molding cavity part Ct for molding the bracket T. The first and second curved recesses 31 and 34 define the bent pipe part-molding cavity Cm for molding the bent pipe part M, and the end piece E is injection molded in a state in which said one end portion 2a of the outer cable 2 is fitted thereinto.

A plurality of positioning projections p1 and p1'; p2 and p2' are provided on the upper die D2 and the lower die D1, the positioning projections p1 and p1'; p2 and p2' carrying out, in cooperation with each other, centering of said one end portion 2a of the outer cable 2 with respect to the bent pipe part-molding cavity part Cm in a state in which said one end portion 2a of the outer cable 2 is fitted into the bent pipe part-molding cavity part Cm. That is, a plurality of pairs of upper and lower first positioning projections p1 and p1' extending in a direction in which they approach each other are projectingly provided on opposing faces of the upper die D2 and the lower die D1, and positioning in the up-and-down direction is carried out by sandwiching said one end portion 2a of the outer cable 2 between the two first positioning projections p1 and p1' from above and below. A plurality of pairs of left and right second positioning projections p2 and p2' sandwiching said one end portion 2a of the outer cable 2 from left and right sides are projectingly provided on at least one of opposing faces of the upper die D2 and the lower die D1 (the lower die D1 in the illustrated example). Positioning in the left-and-right direction (a direction crossing the outer cable 2 horizontally) is carried out by sandwiching said one end portion 2a of the outer cable 2 between the two second positioning projections p2 and p2' from left and right sides.

In this way, said one end portion 2a of the outer cable 2 is correctly positioned and retained at a predetermined set position of the bent pipe part-molding cavity part Cm, that is, a properly centered position, by the first and second positioning projections p1 and p1'; p2 and p2', and it is therefore possible to dispose and fix the bent pipe part M of the end piece E around the centered outer cable 2 in an appropriate concentric attitude, thus achieving good molding properties for the bent pipe part.

Injection molding of the end piece E is carried out by injecting a synthetic resin in a molten state into the cavity C of the molding device D in a state in which a shape-retaining core material R having flexibility is inserted into the liner 3 of the outer cable 2. In the illustrated example, a rope made of a material (for example, nylon, etc.) that does not deform even at the injection molding pressure is used as the shape-retaining core material R, and the external diameter of the shape-retaining core material R is selected so that it is slightly smaller than the internal diameter of the liner 3 of the outer cable 2, therefore making it possible to smoothly slide the shape-retaining core material R within the liner 3 for insertion and extraction. In the present embodiment, a base end part of the shape-retaining core material R is joined to the middle die D3 (in the illustrated example, it is integrally embedded within the middle die D3).

The shape-retaining core material R is inserted into the liner 3 of the outer cable 2 from the extremity side of the shape-retaining core material R, and the insertion operation is carried out before injection molding the end piece E, in particular before setting the outer cable 2 on the lower die D1.

Furthermore, a slightly tapered cylindrical projection 38 surrounding the base end part of the shape-retaining core material R is projectingly and integrally provided on a molding face, facing the bracket-molding cavity part Ct, of the middle die D3. The extremity of the cylindrical projection 38 abuts against an inner peripheral face of the end part of the liner 3 of the cable 2, in particular an inner peripheral face of the increased-diameter second flare part 24, over its entire periphery in a state in which said one end portion 2a of the outer cable 2 is fitted into the bent pipe part-molding cavity part Cm. A hole 40 concentrically surrounding the cylindrical projection 38 with an annular cavity 39 sandwiched therebetween is formed in the middle die D3 so as to directly open in the bracket-molding cavity part Ct. The annular cavity 39 becomes a cavity part for molding the cylindrical projection 7a formed on the first mounting wall 7 of the bracket T.

Furthermore, a molding pin 41 for molding the bolt insertion hole 7b formed in the first mounting wall 7 is fixed to the middle die D3 so as to project into the bracket-molding cavity part Ct.

A sprue (not illustrated) for introducing molten resin into the cavity C, for example the bracket-molding cavity part Ct, is formed at an appropriate position of the molding device D, this sprue being provided with molten resin injection means, which is not illustrated, and molten resin in a pressurized state can be supplied into the cavity C as appropriate.

A specific example of a step of injection molding the end piece E on the operation side is now explained.

First, as shown in FIG. 9, the outer skin 5 is removed from said one end portion 2a of the outer cable 2 of the Bowden cable B so as to expose the end part of the hollow strand 22, the end part of the hollow strand 22 is increased in diameter so as to form the first flare part 23, in which the respective metal individual wires 21 are separated, and the end part of the liner 3 is also increased in diameter so as to form the second flare part 24 adjacent to the first flare part 23.

Subsequently, the outer cable 2 has inserted through the shape-retaining core material R, which has been joined to the middle die D3, from the extremity side of the shape-retaining core material R and going into the first and second flare parts 23 and 24 first. This insertion is carried out up to a position where the first and second flare parts 23 and 24 face the bracket-molding cavity Ct of the middle die D3. Subsequently, the middle die D3 is set on the lower die D1 together with the shape-retaining core material R and the outer cable 2, that is, the lower end part of the middle die D3 is fitted into the recess 33 in the upper face of the lower die D1, and said one end portion 2a of the outer cable 2 is inserted into the first curved recess 31 in the upper face of the lower die D1 while being flexed. In this case, said one end portion 2a of the outer cable 2 is positioned and retained at the centering position of the first curved recess 31 by means of the plurality of pairs of left and right second positioning projections p2 and p2'.

Furthermore, the lower die D1 is covered over with the upper die D2 so as to sandwich the middle die D3 therebetween, thus defining the cavity C between the dies D1 to D3. In this case, said one end portion 2a of the outer cable 2 is clamped from the top and bottom sides by means of the plurality of pairs of upper and lower first positioning projections p1 and p1', and positioned and retained at a predetermined set position, that is, the properly centered position, between the first and second curved recesses 31 and 34 (that is, the bent pipe part-molding cavity part Cm).

In this state, a synthetic resin in a molten state is injected under pressure into the cavity C by means of the sprue, which is not illustrated, thus injection molding the end piece E corresponding to the cavity C. After this injection molding is completed, first the upper die D2 is raised and disengaged from the lower die D1 and the middle die D3, the middle die D3 together with the molded product is subsequently raised with respect to the lower die D1, and the molded product is thus disengaged from the lower die D1 together with the middle die D3. Following this, the molded product is pulled out from the middle die D3 in a direction along the axis of the molding pin 41, and at the same time as the above the outer cable 2 of the Bowden cable B is pulled off the shape-retaining core material R.

By means of the above step, the end piece E on the operation side is insert molded on said one end portion 2a of the outer cable 2. A method of insert molding the end piece E' on the operated side at the other end portion of the outer cable 2 is basically the same as the above step. However, since the shape of the mounting part (the latching groove 14) of the end piece E' on the operated side is simple and the pipe part covering and surrounding the other end portion of the outer cable 2 has no bent portion, the structure and shape of the molding device may be made simple compared with that of the molding device D.

In accordance with the embodiment, since the end piece E on the operation side includes the bracket T as the mounting part for fixing and supporting it on the support member Fa, and the bent pipe part M covering and surrounding the outer periphery of said one end portion 2a of the outer cable 2 in a curved state, and these T and M are formed integrally by injection molding, it becomes possible to mold the end piece E having a complicated overall three-dimensional shape that includes the mounting part T and the bent pipe part M easily with good precision by injection molding using a synthetic resin. Furthermore, even if the direction in which said one end part of the Bowden cable B is pulled and the direction in which the cable extends from the end piece E are different from each other, it is possible to reliably retain the shape of the curve of the outer cable one end portion 2a, which curves so as to conform to the extending direction, by means of the bent pipe part M of the end piece E.

In the case of the mounting part T and the bent pipe part M being produced separately using a metal, since it would be necessary to join the two afterward, it would also be necessary to insert a resin pipe inner for protecting the inner wire into the inner periphery of the metal bent pipe part M and, moreover, it would be necessary to join the metal bent pipe part M and the end part of the outer cable 2 by swaging, the overall number of components and the number of processing steps would increase, thus causing an increase in the cost or an increase in the weight, and there is a possibility of causing a problem, for example, that a step would occur in a section where the resin pipe inner and the end part of the outer cable 2 are joined within the bent pipe part M, thus degrading the sliding properties of the inner wire 1. On the other hand, in the present embodiment, since the bent pipe part M in which said one end portion 2a of the outer cable 2 is insert molded and the bracket T (mounting part) are joined as a unit by molding them integrally using a synthetic resin, all of the above problems can be solved. That is, it is possible to achieve a large reduction in the number of components and the number of processing steps, thus reducing the cost and lightening the weight and, furthermore, it is possible to extend lengthwise said one end portion 2a of the outer cable 2 up to the vicinity of the outer end of the end piece E through the bent pipe part M in a vertical manner, and since it is unnecessary to separately connect the resin pipe inner to the end part of the outer cable, it is possible to avoid any degradation in the sliding properties of the inner wire 1 due to a step in the join section and, consequently, any degradation in the operational feel.

Furthermore, in the present embodiment, since in a state in which said one end portion 2a of the outer cable 2 is inserted into at least the bent pipe part-molding cavity part Cm of the cavity C of the molding device D and the shape-retaining core material R having flexibility is inserted into the liner 3 of the outer cable 2, a synthetic resin in a molten state is injected into the cavity C, the injection molding pressure can be withstood sufficiently by the shape-retaining core material R. This enables collapsing or deformation of the outer cable 2 due to high molding pressure to be prevented effectively by means of the shape-retaining core material R even when for example the outer cable 2 has a relatively small diameter and low stiffness or when a flat thin part is formed in the outer skin 5 due to the outer cable 2 being bent, thus enhancing effectively the sliding properties of the inner wire 1 in a state in which the inner wire 1 is inserted through the outer cable 2 after molding, and consequently the operational feel.

Moreover, in the present embodiment, a base end of the shape-retaining core material R is joined to some of the molding elements, for example, the middle die D3, and the shape-retaining core material R is inserted into the liner 3 of the outer cable 2 from the extremity side of the shape-retaining core material R before injection molding. This enables the base end of the shape-retaining core material R to be put in a state in which it is joined to the middle die D3 in advance, thus enabling the operation of positioning and setting the shape-retaining core material R on the molding device D to be carried out efficiently.

The present invention is not limited to the above-mentioned embodiment and may be modified in a variety of ways as long as the modifications do not depart from the gist of the present invention.

For example, the strength and stiffness of the shield 4 can be further enhanced by forming the shield 4 by forming the hollow strand 22 as multiple layers. In this case, the effect of anchoring the first flare part 23 to the end piece E can be enhanced by an increase in the number of metal individual wires 21 of the first flare part 23, thus further enhancing the strength with which the end piece E and the outer cable 2 are connected.

Furthermore, the L-shaped bracket T as a mounting part of the end piece E on the operation side is illustrated in the embodiment, but the shape of the mounting part is not limited to that of the embodiment, and various shapes may be employed as long as they can be mounted on the support member.

Moreover, in the embodiment, with regard to the end piece E on the operation side, one in which the mounting part T and the bent pipe part M are integrally molded is shown, but the same structure may be implemented for the end piece on the operated side.

Furthermore, in the embodiment, one in which the Bowden cable B is applied to a lock release device of a seat lock-operating mechanism of a two-wheeled motor vehicle is shown, but the Bowden cable of the present invention may be applied to an operation system other than an operation system for the seat lock-operating mechanism of a two-wheeled motor vehicle, for example, an operation system for a clutch, a brake, etc. and an operation system for a throttle valve and may be applied to various types of operation system other than those for a vehicle.

What is claimed is:

1. A method for connecting an end piece and an outer cable in a Bowden cable comprising:
    a flexible inner wire;
    a flexible outer cable that has the inner wire inserted therethrough and that guides sliding movement thereof, the outer cable comprising a liner that is made of a synthetic resin and directly guides sliding of the inner wire, a hollow shield that houses and retains the liner, and an outer skin that is made of a synthetic resin and covers an outer periphery of the shield, wherein the shield is formed from a hollow strand that is formed by twisting a plurality of metal individual wires arranged so as to be in intimate contact with each other around the liner, the outer skin is removed to expose an end part of this hollow strand, the end part of this hollow strand is increased in diameter to form a first flare part in which the metal individual wires of the shield are separated, an end part of the liner is also increased in diameter to form a second flare part that is adjacent to the first flare part and
    an end piece that is connected to one end portion of the outer cable and has the inner wire inserted therethrough, the end piece comprising a mounting part for fixing and supporting the end piece on a support member, and a bent pipe part for covering and surrounding an outer periphery of said one end portion of the outer cable in a state in which the outer cable is curved;
    said method comprising a step of forming the mounting part and the bent pipe part as a unit by injection molding, the end piece being injection molded so as to envelop said first and second flare parts, wherein a synthetic resin as a material of this end piece is made to enter between the metal individual wires of the shield;
    wherein a cavity having at least a mounting part-molding cavity part and a bent pipe part-molding cavity part for molding the mounting part and the bent pipe part respectively are formed between a plurality of molding elements dividedly forming a molding device used in said injection molding,
    wherein said injection molding is carried out so that the synthetic resin in a molten state is injected into the cavity in a state in which said one end portion of the outer cable is fitted into at least the bent pipe part-molding cavity part of the cavity, and a shape-retaining core material having flexibility is inserted into the liner of the outer cable,
    and wherein a base end of the shape-retaining core material is joined to at least some of the molding elements, and the shape-retaining core material is inserted into the liner of the outer cable prior to said injection molding from an extremity side of the shape-retaining core material.

2. The method for connecting an end piece and an outer cable in a Bowden cable according to claim 1, wherein at least some of the molding elements are provided with a plurality of positioning projections for centering, in cooperation with each other,
    and wherein said one end portion of the outer cable fitted into the bent pipe part-molding cavity part of the cavity, and is positioned and retained at a predetermined set position of the bent pipe part-molding cavity part during said injection molding by means of the positioning projections.

3. A method for connecting an end piece and an outer cable in a Bowden cable comprising:
    a flexible inner wire;
    a flexible outer cable that has the inner wire inserted therethrough and that guides sliding movement thereof, the outer cable comprising a liner that is made of a synthetic resin and directly guides sliding of the inner wire, a hollow shield that houses and retains the liner, and an outer skin that is made of a synthetic resin and covers an outer periphery of the shield, wherein the shield is formed from a hollow strand that is formed by twisting a plurality of metal individual wires arranged so as to be in intimate contact with each other around the liner, the outer skin is removed to expose an end part of this hollow strand, the end part of this hollow strand is increased in diameter to form a first flare part in which the metal individual wires of the shield are separated, an end part of the liner is also increased in diameter to form a second flare part that is adjacent to the first flare part and
    an end piece that is connected to one end portion of the outer cable and has the inner wire inserted therethrough, the end piece comprising a mounting part for fixing and supporting the end piece on a support member, and a bent pipe part for covering and surrounding an outer periphery of said one end portion of the outer cable in a state in which the outer cable is curved;
    said method comprising a step of forming the mounting part and the bent pipe part as a unit by injection molding, the end piece being injection molded so as to envelop said first and second flare parts, wherein a synthetic resin as a material of this end piece is made to enter between the metal individual wires of the shield;
    wherein at least some of the molding elements are provided with a plurality of positioning projections for centering, in cooperation with each other,
    wherein said one end portion of the outer cable with respect to the bent pipe part-molding cavity part in a state in which said one end portion of the outer cable is fitted into the bent pipe part-molding cavity part of the cavity, and is positioned and retained at a predetermined set position of the bent pipe part-molding cavity part during said injection molding by means of the positioning projections,
    and wherein a base end of the shape-retaining core material is joined to at least some of the molding elements, and the shape-retaining core material is inserted into the liner of the outer cable prior to said injection molding from an extremity side of the shape-retaining core material.

4. A method for connecting an end piece and an outer cable in a Bowden cable in order to obtain a connecting structure therebetween,
wherein the Bowden cable comprises a flexible inner wire, a flexible outer cable that has inserted therethrough the inner wire and guides sliding thereof, and an end piece that is connected to one end portion of the outer cable and has inserted therethrough the inner wire, the outer cable comprising a liner that is made of a synthetic resin and directly guides sliding of the inner wire, a hollow shield that houses and retains the liner, and an outer skin that is made of a synthetic resin and covers an outer periphery of the shield,
wherein the shield is formed from a hollow strand that is formed by twisting a plurality of metal individual wires arranged so as to be in intimate contact with each other around the liner, the outer skin is removed to expose an end part of this hollow strand, the end part of this hollow strand is increased in diameter to form a first flare part in which the metal individual wires are separated, an end part of the liner is also increased in diameter to form a second flare part that is adjacent to the first flare part, the end piece is injection molded so as to envelop the first and second flare parts, the synthetic resin as a material of this end piece is made to enter between the metal individual wires, the end piece comprises a mounting part for fixing and supporting the end piece on a support member and a bent pipe part for covering and surrounding an outer periphery of said one end portion of the outer cable in a state in which the outer cable is curved, and the mounting part and the bent pipe part are formed as a unit by said injection molding,
wherein a cavity having at least a mounting part-molding cavity part and a bent pipe part-molding cavity part for molding the mounting part and the bent pipe part respectively is formed between a plurality of molding elements dividedly forming a molding device used in said injection molding, and
the method comprising a step of carrying out said injection molding so that a synthetic resin in a molten state is injected into the cavity, in a state in which said one end portion of the outer cable is fitted into at least the bent pipe part-molding cavity part of the cavity and a shape-retaining core material having flexibility is inserted into the liner of the outer cable.

5. The method according to claim 4, wherein a gap is provided between the first and second flare parts, the synthetic resin entering the gap.

6. The method according to claim 5, wherein a base end of the shape-retaining core material is joined to at least some of the molding elements, and the shape-retaining core material is inserted into the liner of the outer cable prior to said injection molding from an extremity side of the shape-retaining core material.

7. The method according to claim 6, wherein at least some of the molding elements are provided with a plurality of positioning projections for centering, in cooperation with each other, said one end portion of the outer cable with respect to the bent pipe part-molding cavity part in a state in which said one end portion of the outer cable is fitted into the bent pipe part-molding cavity part of the cavity, and said one end portion of the outer cable is correctly positioned and retained at a predetermined set position of the bent pipe part-molding cavity part during said injection molding by means of the positioning projections.

8. The method according to claim 5, wherein at least some of the molding elements are provided with a plurality of positioning projections for centering, in cooperation with each other, said one end portion of the outer cable with respect to the bent pipe part-molding cavity part in a state in which said one end portion of the outer cable is fitted into the bent pipe part-molding cavity part of the cavity, and said one end portion of the outer cable is correctly positioned and retained at a predetermined set position of the bent pipe part-molding cavity part during said injection molding by means of the positioning projections.

9. The method according to claim 5, wherein the second flare part is formed so as to have a smaller diameter than that of the first flare part.

10. The method according to claim 9, wherein a base end of the shape-retaining core material is joined to at least some of the molding elements, and the shape-retaining core material is inserted into the liner of the outer cable prior to said injection molding from an extremity side of the shape-retaining core material.

11. The method according to claim 10, wherein at least some of the molding elements are provided with a plurality of positioning projections for centering, in cooperation with each other, said one end portion of the outer cable with respect to the bent pipe part-molding cavity part in a state in which said one end portion of the outer cable is fitted into the bent pipe part-molding cavity part of the cavity, and said one end portion of the outer cable is correctly positioned and retained at a predetermined set position of the bent pipe part-molding cavity part during said injection molding by means of the positioning projection.

12. The method according to claim 9, wherein at least some of the molding elements are provided with a plurality of positioning projections for centering, in cooperation with each other, said one end portion of the outer cable with respect to the bent pipe part-molding cavity part in a state in which said one end portion of the outer cable is fitted into the bent pipe part-molding cavity part of the cavity, and said one end portion of the outer cable is correctly positioned and retained at a predetermined set position of the bent pipe part-molding cavity part during said injection molding by means of the positioning projections.

13. The method according to claim 4, wherein a base end of the shape-retaining core material is joined to at least some of the molding elements, and the shape-retaining core material is inserted into the liner of the outer cable prior to said injection molding from an extremity side of the shape-retaining core material.

14. The method according to claim 13, wherein at least some of the molding elements are provided with a plurality of positioning projections for centering, in cooperation with each other, said one end portion of the outer cable with respect to the bent pipe part-molding cavity part in a state in which said one end portion of the outer cable is fitted into the bent pipe part-molding cavity part of the cavity, and said one end portion of the outer cable is correctly positioned and retained at a predetermined set position of the bent pipe part-molding cavity part during said injection molding by means of the positioning projections.

15. The method according to claim 4, wherein at least some of the molding elements are provided with a plurality of positioning projections for centering, in cooperation with each other, said one end portion of the outer cable with respect to the bent pipe part-molding cavity part in a state in which said one end portion of the outer cable is fitted into the bent pipe part-molding cavity part of the cavity, and said one end portion of the outer cable is correctly positioned and retained at a predetermined set position of the bent pipe part-molding cavity part during said injection molding by means of the positioning projections.

\* \* \* \* \*